US011321579B2

(12) United States Patent
Gupta et al.

(10) Patent No.: US 11,321,579 B2
(45) Date of Patent: May 3, 2022

(54) MULTIPLE SOURCE PLACE MATCHING SYSTEM

(71) Applicant: Uber Technologies, Inc., San Francisco, CA (US)

(72) Inventors: Kapil Gupta, Sunnyvale, CA (US); Sai Bhuvan Teja Balla, Sunnyvale, CA (US); Susmit Biswas, San Mateo, CA (US); Chun-Chen Kuo, Palo Alto, CA (US); Jeremy Hintz, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 398 days.

(21) Appl. No.: 16/518,069

(22) Filed: Jul. 22, 2019

(65) Prior Publication Data

US 2020/0034655 A1 Jan. 30, 2020

Related U.S. Application Data

(60) Provisional application No. 62/711,848, filed on Jul. 30, 2018.

(51) Int. Cl.
| G06K 9/62 | (2022.01) |
| G06F 16/215 | (2019.01) |
| G06F 16/29 | (2019.01) |
| G06N 20/00 | (2019.01) |

(52) U.S. Cl.
CPC ......... *G06K 9/6215* (2013.01); *G06F 16/215* (2019.01); *G06F 16/29* (2019.01); *G06K 9/6218* (2013.01); *G06N 20/00* (2019.01)

(58) Field of Classification Search
CPC .. G06K 9/6215; G06K 9/6218; G06F 16/215; G06F 16/29
See application file for complete search history.

(56) References Cited

U.S. PATENT DOCUMENTS

2019/0171733 A1* 6/2019 AuYoung ............... G06N 20/00

\* cited by examiner

*Primary Examiner* — Robert G Bachner
(74) *Attorney, Agent, or Firm* — Schwegman Lundberg & Woessner, P.A.

(57) ABSTRACT

Systems and methods are provided for generating a places dataset comprising place data from multiple data sources each having a plurality of place data. Based on the places dataset, the systems and methods generate local clusters comprising places located within a predetermined distance, generate probable pairs of places in each local cluster, and distribute the probable pairs to one or more processors to determine similar edges between one or more places in each local cluster based on a plurality of combined similarity measures indicating whether or not a place is similar to another place. The systems and methods further generate similar pairs based on the combined similarity measures and convert the similar pairs into connected components comprising groups of similar places based on a best similar edge from all the candidates for a group of similar places.

20 Claims, 22 Drawing Sheets

MULTIPLE SOURCE PLACE MATCHING SYSTEM

CLAIM FOR PRIORITY

This application claims the benefit of priority of U.S. Provisional Application No. 62/711,848, filed Jul. 30, 2018, which is hereby incorporated by reference in its entirety.

BACKGROUND

There are a number of technical challenges to generating a mapping system. For example, to map all the places in a particular region (e.g., country, county, or state) multiple sources comprising place information (e.g., information about entities within the regions, such as a business, park, location of interest, or residence) may be used to generate places for the region. These multiple sources may each comprise millions of records associated with places. Each of these sources may contain multiple attributes about each place (e.g., a name, address, category, description, and other information about a place), may have different attributes, may be missing one or more attributes, and so forth, for the same place. For example, one or more sources of place information may have missing addresses, addresses that are not normalized (e.g., different abbreviations may be used, different levels of detail may be included), inaccurate latitude and longitude data, incomplete or inaccurate names, fake and irrelevant places, point of interest data that is not homogeneous, moved or closed places, differing coverage of places, and so forth. Thus, text matching alone is not sufficient to match a place from multiple sources of place data. Accordingly, technical solutions are needed to match millions of records of place data from multiple sources to conflate to a single place.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to matching place data from multiple sources to conflate to a single place. Example embodiments can process millions of data points from multiple data sources to generate groups of places from different sources that are associated with a single place. From these groups of places each associated with a single place, a places dataset may be created and used for various applications, from mapping and navigation, to identifying points of interest, and so forth.

There are many technical challenges to determining whether or not place data from a first source matches place data from a second source, and so forth, as explained above. For example, one source may have place data for "Spa at Four Seasons Hotel Philadelphia, 1 Logan Sq, Philadelphia, Pa." and a second source may have place data for "Four Seasons Hotel Philadelphia, 1 Logan Square, Philadelphia, Pa. 19103, United States." Example embodiments address various technical challenges to be able to match place data from multiple sources to conflate to a single place. In one example embodiment, a server system generates a places dataset comprising place data from multiple data sources comprising a plurality of place data, local clusters comprising places located within a predetermined distance, and probable pairs of places in each local cluster. The server system distributes the probable pairs to one or more processors to determine similar edges between one or more place in each local cluster based on a plurality of combined similarity measures indicating whether or not a place is similar to another place. The server system generates similar pairs based on the combined similarity measures and converts the similar pairs into connected components comprising groups of similar places based on the best similar edge from all the candidates for a group of similar places.

Figure 1:
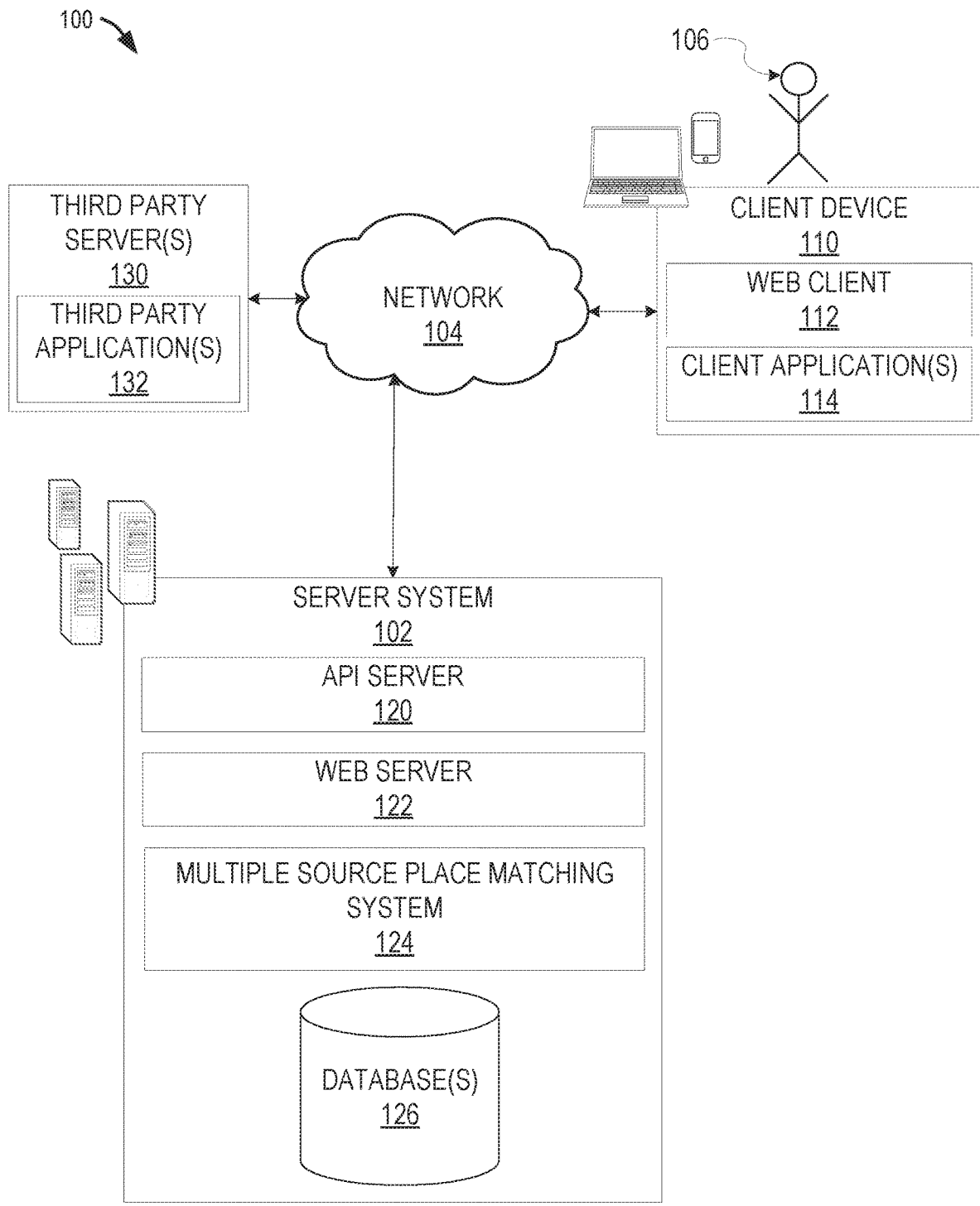
FIG. 1 is a block diagram illustrating a networked system configured to conflate place data from multiple sources to a single place, according to some example embodiments.

FIG. 1 is a block diagram illustrating a networked system 100, according to some example embodiments, configured to conflate place data from multiple sources to a single place. The system 100 includes one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to request map information, provide map information, request navigation information, receive and display results of map and/or navigation information, request data about a place in a particular location, receive and display data about a place in a particular location, and so forth.

One or more users 106 may be a person, a machine, or other means of interacting with the client device 110. In example embodiments, the user 106 is not be part of the system 100, but interacts with the system 100 via the client device 110 or other means. For instance, the user 106 provides input (e.g., touch screen input or alphanumeric input) to the client device 110 and the input is communicated to other components in the system 100 (e.g., third-party servers 130, server system 102) via the network 104. In this instance, the other components in the system 100, in response to receiving the input from the user 106, communicate information to the client device 110 via the network 104 to be presented to the user 106. In this way, the user 106 interacts with the various components in the system 100 using the client device 110.

The system 100 further includes a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 accesses the various data and applications provided by other components in the system 100 via web client 112 (e.g., a browser, such as the Internet Explorer® browser developed by Microsoft® Corporation of Redmond, Wash. State) or one or more client applications 114. The client device 110 includes one or more client applications 114 (also referred to as "apps") such as, but not limited to, a web browser, messaging application, electronic mail (email) application, an e-commerce site application, a mapping or location application, and the like.

In some embodiments, one or more client applications 114 is included in the client device 110, and configured to locally provide the user interface and at least some of the functionalities, with the client application 114 configured to communicate with other components in the system 100 (e.g., third-party servers 130, server system 102), on an as needed basis, for data and/or processing capabilities not locally available (e.g., access location information, access software version information, to generate results of security-relevant code detection, to authenticate a user 106, or to verify a method of payment). In other embodiments, one or more applications 114 is not included in the client device 110, and the client device 110 uses its web browser to access the one or more applications hosted on other components in the system 100 (e.g., third-party servers 130, server system 102).

A server system 102 provides server-side functionality via the network 104 (e.g., the Internet or wide area network (WAN)) to one or more third-party servers 130 and/or one or more client devices 110. The server system 102 includes an application program interface (API) server 120, a web server 122, and a multiple source place matching system 124, that are each communicatively coupled with one or more databases 126.

The one or more databases 126 are storage devices that store data related to source code, machine learning model training data, place or other mapping data, and so forth. The one or more databases 126 may further store information related to third-party servers 130, third-party applications 132, client devices 110, client applications 114, users 106, and so forth. In some embodiments, the one or more databases 126 are cloud-based storage.

The server system 102 is a cloud computing environment, according to some example embodiments. The server system 102, and any servers associated with the server system 102, are associated with a cloud-based application, in one example embodiment.

The multiple source place matching system 124 provides back-end support for third-party applications 132 and client applications 114, which may include cloud-based applications. The multiple source place matching system 124 processes place data from a variety of sources, trains and tests machine learning models, and so forth as described in further detail below. The multiple source place matching system 124 comprises one or more servers or other computing devices or systems.

The system 100 further includes one or more third-party servers 130. The one or more third-party servers 130 include one or more third-party application(s) 132. The one or more third-party application(s) 132, executing on third-party server(s) 130, interact with the server system 102 via a programmatic interface provided by the API server 120. For example, one or more the third-party applications 132 request and utilize information from the server system 102 via the API server 120 to support one or more features or functions on a website hosted by the third party or an application hosted by the third party.

Figure 2:
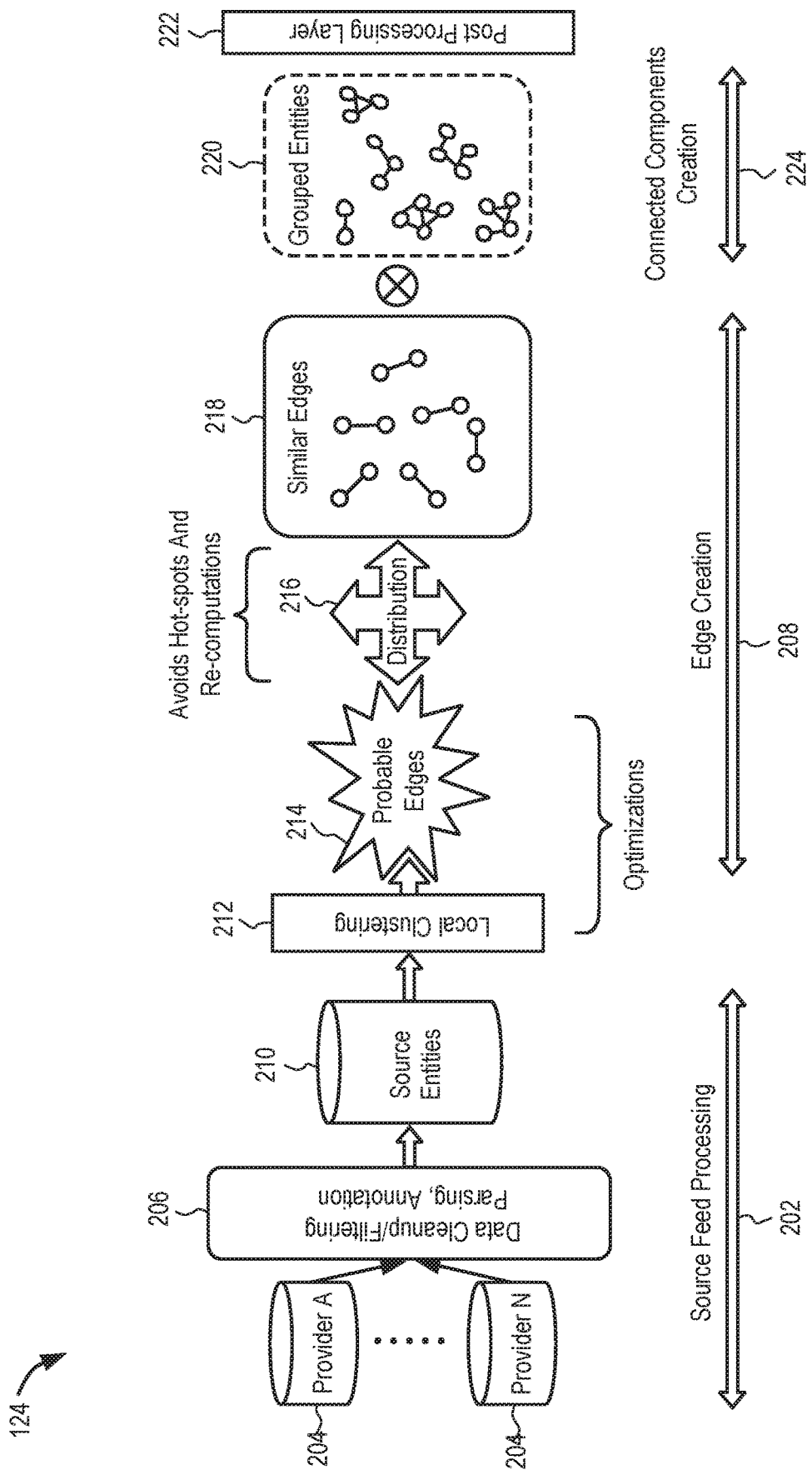
FIG. 2 is a block diagram illustrating a multiple source place matching system, according to some example embodiments.

FIG. 2 is a block diagram illustrating further details of the multiple source place matching system 124, according to some example embodiments. In the block diagram of FIG. 2, the multiple source place matching system 124 is shown having three phases: a source feed processing phase 202, an edge creation phase 208, and a connected component creation phase 224.

In the source feed processing phase 202, the multiple source place matching system 124 can access (e.g., receive, retrieval) multiple data sources 204 each comprising a plurality of place data. The multiple data sources 204 are systems separate from the multiple source place matching system 124 (e.g., third-party data sources associated with third-party server(s) 130) and/or systems associated with the multiple source place matching system 124 (e.g., data sources internal or coupled with the multiple source place matching system 124). Each data source 204 comprises a plurality of place data for various places for a given region or for the entire world. A place is an entity such as a business (e.g., restaurant, bar, gym, nightclub), a park or outdoor venue (e.g., city park, state park, national park, town square, outdoor theater), a school, a municipal building, a museum, and so forth. Each data source 204 has a variety of attributes for each place that provide further information about the place. Some examples of attributes include a place name, address, latitude and longitude coordinates, one or more categories, and so forth. Attributes may differ between data sources.

In the source feed processing phase 202, the multiple source place matching system 124 processes the data received from the multiple data sources 204 to generate a places dataset comprising the place data from the multiple data sources 204 and stores the place dataset as source entities (places) in one or more databases 210. The multiple source place matching system 124 processes the raw source data received from the multiple data sources 204 by cleaning up the data (e.g., removing extraneous characters or information), filtering the information, parsing the information, annotating the information, and the like, as indicated by 206, to put or transform the place data in a common data format to be used for edge creation.

In the edge creation phase 208, the multiple source place matching system 124 generates local clusters of the source places, as explained in further detail below. Local clustering 212, in one example embodiment, optimizes the multiple source place matching system 124 to avoid doing quadratic computation to find "similar" places within source data. Because of the nature of the data, places representing the same physical space will be in a nearby area (if not exactly the same point). Considering all the places present within a predetermined distance should bring together all the relevant places for a particular physical space.

Figure 3:
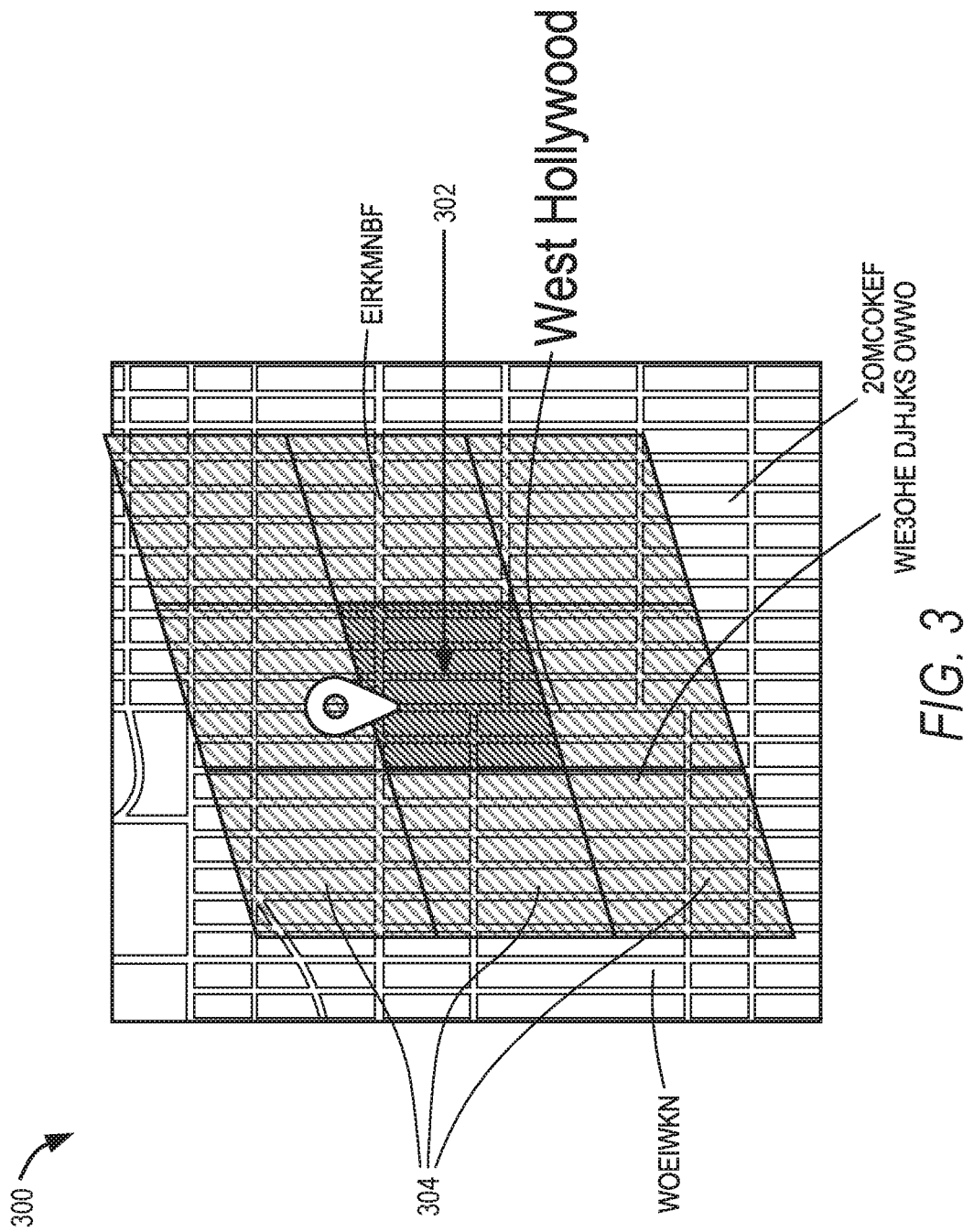
FIG. 3 illustrates an example of how a particular area may be divided into cells, according to some example embodiments.

In one example, a region of interest (e.g., city, state, country) is partitioned into a grid of cells based on distance. Each cell is a predetermined size. In one example, an approach is based on S2 cells. The local clusters comprise a group of places (e.g., from the multiple data sources) that are within a predetermined distance based on the S2 cells (e.g., based on the occurrence in the same or neighbor S2 cells (e.g., to cover cases where potential matches are near the border of an S2 cells)). FIG. 3 illustrates an example 300 of how a particular area may be divided into cells. In this example, cells 304 are some of the neighboring cells to cell 302. The neighboring cells to a particular cell comprise all of the cells that surround the particular cell. In one example embodiment, an approach is to operate on S2 Cell level 14 and bring all the neighboring cell places as candidates for further evaluation. In this embodiment, all the places at least within 550 meters are covered.

Returning to FIG. 2, the multiple source place matching system 124 generates probable edges 214 for the candidate set of places in each local cluster by removing obvious non-matches using heuristics to select candidates, such as candidates having at least one common token, candidates within a predetermined distance (e.g., 550 meters), candidates with names that can be transformed to match, and so forth. The advantage of doing a probable edge computation is to avoid doing more rigorous and time consuming "similar edge" calculations, explained in further detail below.

The multiple source place matching system 124 then determines distribution of the edges 216 and distributes the edges 216 to one or more processors. For example, the load is distributed to different processors to avoid locality based hot spots. Hot spots are where places data is skewed based on geographic location. For example, downtown or more populated areas tend to have a higher number of businesses compared to sparsely populated areas like in the middle of a highway. This means, if the system is not careful with data distribution, densely populated cities will perform worse computationally (e.g., since it has more candidates to match against and all the candidates are processed in the same processor which makes the processor take a very long time). To avoid such a condition, the data is distributed to multiple processors based on the density of the S2 cell. This is done by assigning unique processors, which will be only processing the data in the dense S2 cell and the data in non-dense S2 cell is assigned randomly in the remaining processors. This way the S2 cells which take a longer time to process are not piled up at one processor which results in avoiding hotspots. The multiple source place matching system 124 then computes the similar edges 218, as explained in further detail below.

In the connected components creation phase 224, the multiple source place matching system 124 generates grouped places 220, as explained in further detail below. The multiple source place matching system 124 may further comprise a post processing layer 222. For example, post processing comprises breaking weak or negative edges (e.g., re-visiting grouping based on a graph structure to split connections via weak edges), preserving overrides from operator input, avoiding collapsing known venue/sub-venue relationships (e.g., a pharmacy inside a retail store, a convenience store inside a gas station), avoiding merging trusted chain places, even if high in similarity score (e.g., two chain coffee shops in the same dense block of a big city), and so forth.

Figure 4:
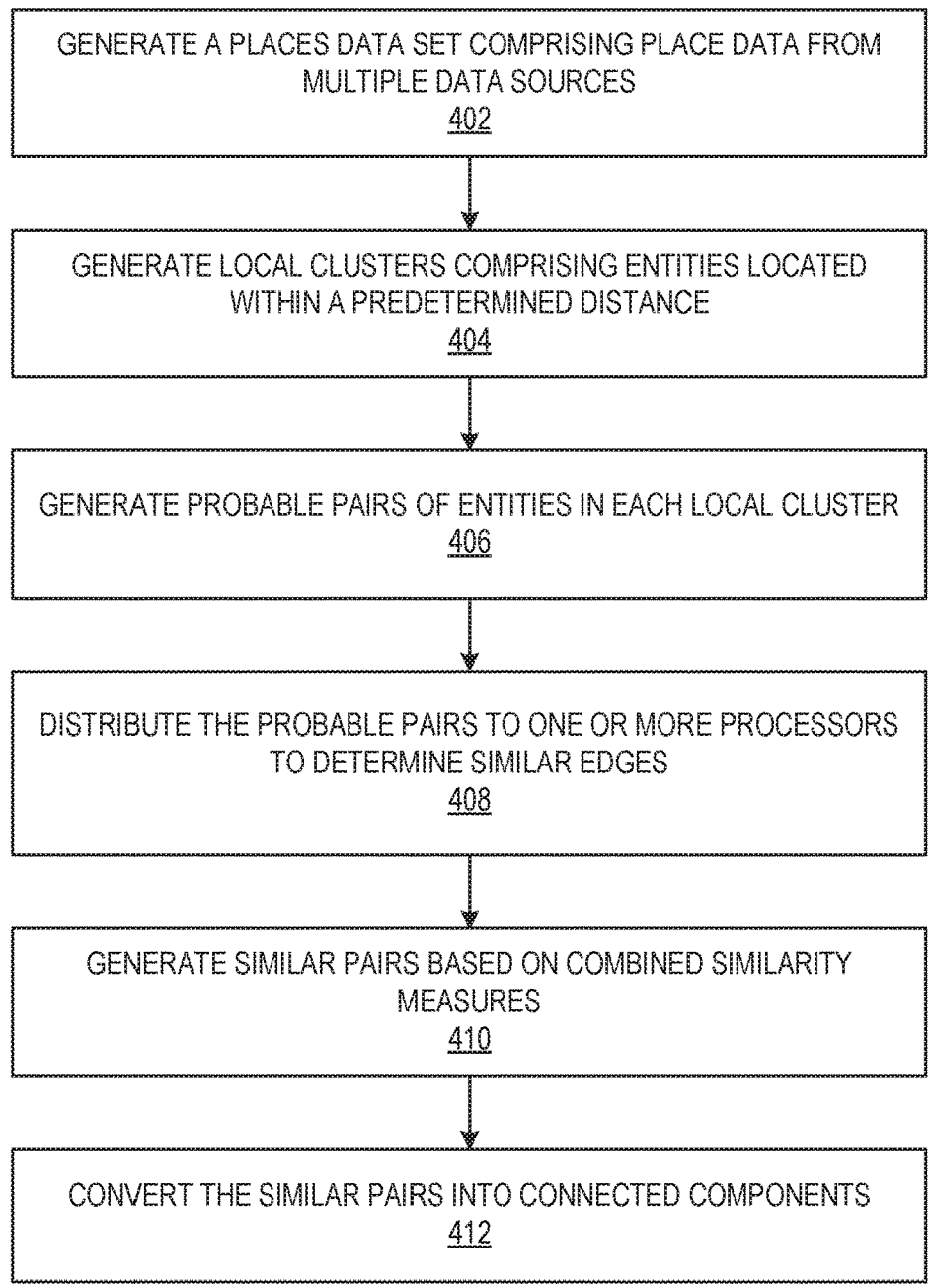
FIG. 4 is flowchart illustrating aspects of a method for generating grouped places from multiple data sources, according to some example embodiments.

FIG. 4 is a flow chart illustrating aspects of a method 400 for generating grouped places from multiple data sources, according to some example embodiments. For illustrative purposes, the method 400 is described with respect to the networked system 100 of FIG. 1 and the example block diagram in FIG. 2 illustrating the multiple source place matching system 124. It is to be understood that method 400 may be practiced with other system configurations in other embodiments.

In operation 402, a computing system or server system (e.g., multiple source place matching system 124) generates a places dataset comprising place data from multiple sources. In one example, the server system accesses (receives or retrieves) a plurality of place data from two or more data sources 204 to generate a places data set from the two or more data sources. Generating the places dataset may further comprise processing the raw data from multiple data sources 204 to obtain a common format. For example, the server system cleans up the data (e.g., remove extraneous characters or information), filters the data, parses the data, annotates the data, and the like. The server system may store the places data set in one or more databases 126 and/or 210.

In operation 404, the server system generates local clusters comprising places within a predetermined distance. In one example, the server system generates the local clusters based on dividing a desired region into a grid comprising a plurality of cells. Each cell may comprise a predetermined square area and each cell comprises a plurality of places that are located in the location contained in the cell. In this way, all places within a predetermined distance may be considered together as candidates for similar places. For example, all the places in the cell 302 of FIG. 3 can be considered as candidates for similar places. he places in neighboring cells 304 and within a predetermined distance from another place are considered as candidates. For example, the server system may operate on S2 cell level 14 and then bring all the neighboring cell places (e.g., the cells that border on the cell upon which the server system is focused) as candidates for further evaluation. In this example, the local cluster covers all the places at least within 550 meters.

Returning to FIG. 4, in operation 406, the server system generates probable edges or pairs of places in each local cluster. Generating probable pairs optimizes the server system because the server system can consider the probable pairs instead of all the candidates when later performing more rigorous and time consuming "similar edge" calculations. To generate the probable pairs, the server system removes non-matches from the candidate set (e.g., the places within the local cluster) by using heuristics. For example, the server system analyzes each candidate to determine if it has at least one common token (e.g., same word or number in the same attribute) with another candidate, if it is within a predetermined distance (e.g., 500 meters, 560 meters) of another candidate, or if the name of the candidate may be transformed to match another candidate (e.g., using normalizations such as special character removal, abbreviation, and word to number/number to word). In one example, the server system takes into account a category based distance threshold. For example, if a place is categorized as a park or an airport, it may have a larger distance threshold (e.g., 1 mile) versus a place categorized as a coffee shop or gas station (e.g., 500 meters). If at least one predetermined method determines a likelihood of two places being similar, those two places are considered a probable pair.

In operation 408, the server system determines distribution of the probable pairs and distributes the probable pairs to one or more processors to determine similar edges. One way to distribute the probable pairs is based on the cell or local cluster for processing. However, there may be a skewed distribution of cells based on density in particular regions. As explained above, cells in a more densely populated area (e.g., a downtown area or a more populated city) may contain many more places than a rural location. The cells comprising more places will require more calculations and thus may take considerably more time than cells comprising less places. The table below shows an example of density distribution of S2 cells in an example region (entities in the table refers to places):

| No. of entities in S2 Cell | >100K | >50K | >25K | >10K | >1K | <=1K |
|---|---|---|---|---|---|---|
| No. of computations | >5B | >1.25B | >0.3B | >50M | >0.5M | <=0.5M |
| No. of S2 Cells | 4 | 28 | 88 | 416 | 50637 | 7543371 |

In the example in the above table, there are four cells with over one-hundred thousand places, which results in over five billion computations, versus over seven million cells with less than one thousand places, which would result in less than half of a million computations. The result of distribution simply based on cells is that one processor may take a much longer time (e.g., thirty hours) because all the neighboring S2 cell data around a dense S2 cell will be processed in the same processor by the default practitioner in the distributed processing system while another may take a much shorter time (e.g., four hours) to complete the computations for another cells with less places. Accordingly, in one example embodiment the probable pairs are partitioned based on the cell density in which cells which need very large computation are assigned a unique processor so that no other computations are performed on the processor other than that specific dense S2 cell. The less dense S2 cells are assigned to the remaining processors in random as it takes less time to finish processing the data in the less dense cells. This way, no processor processing a dense S2 cell's data is assigned any other S2 cell data for computation. This is done using a custom partitioning function which looks at the density of each S2 cell and assigns the appropriate processor to avoid hotspots.

In one embodiment, the server system determines the similar edges between one or more places based on a plurality of combined similarity measures indicating whether or not a place is similar to another place. For example, the server system determines the similar edges by computing attribute level scores (e.g., similarity measures) for each probable pair and then computing the overall score (e.g., combined similarity measures) using a machine learning model to combine the attribute level scores and output an overall score (e.g., between 0 and 1) indicating a probability that the probable pair is similar (e.g., that the two places are associated with the same physical place).

Figure 5:
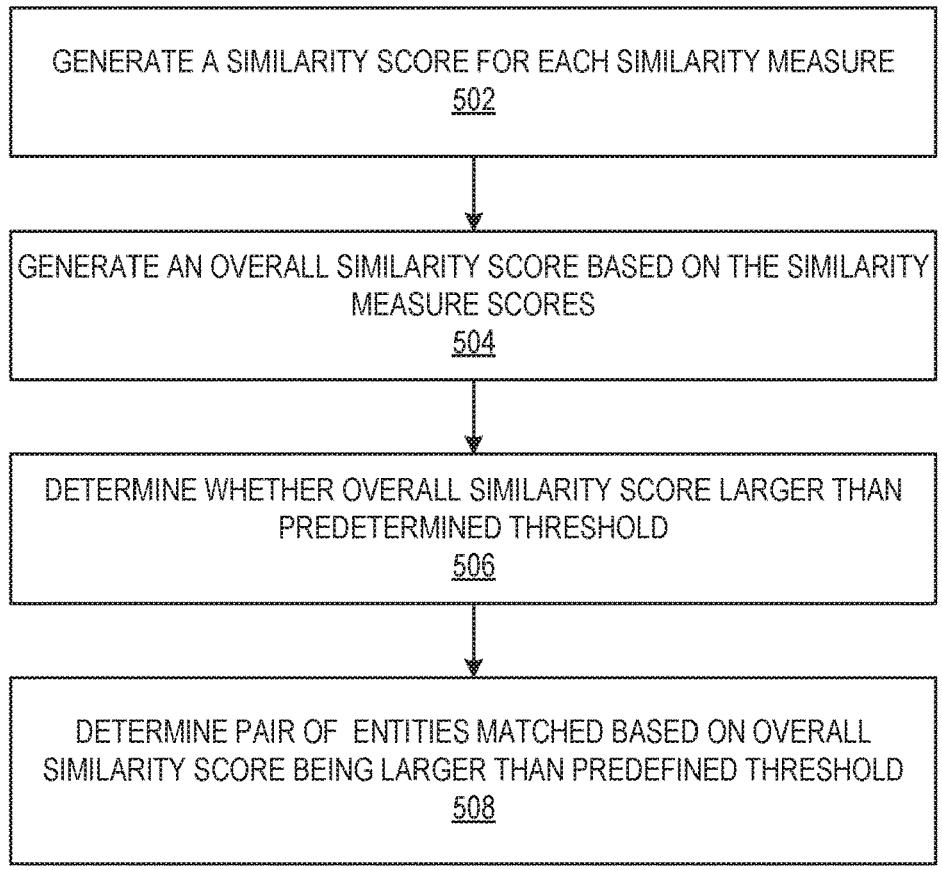
FIG. 5 is flowchart illustrating aspects of a method for determining similar edges, according to some example embodiments.

FIG. 5 is a flow chart illustrating aspects of a method 500 for determining similar edges, according to some example embodiments. For illustrative purposes, the method 500 is described with respect to the networked system 100 of FIG. 1 and example block diagram in FIG. 2 illustrating the multiple source place matching system 124. It is to be understood that method 500 may be practiced with other system configurations in other embodiments.

As indicated above, the server system may consider a number of similarity measures to determine the likelihood that a pair of places are similar (e.g., are associated with the same place). A similarity measure may be associated with a particular attribute for a place. Some example similarity measures/attributes include the following:
Address
Street Number Match Score
Street Name Match Score
Is Address Valid
Is Address Normalized
Name
Semantic Name Matching Score
String Matching Score
Distance
Distance
Distance Score
Density (e.g., number of places in a cell)
Distance Density Product
Category
Top 5 categories
Category Match Type
Category Common Level
Others
Chain Count
Same Chain
Is Subvenue
Is Positive Edge (can instead be a post-processing step)
Phone Number
Same number
The above list of example similarity measures is not an exhaustive list. Other similarity measures may be used beyond what is in the above list. Likewise, not all similarity measures may be used; the server system may use only a subset of the available similarity measures.

In operation 502, the server system generates a similarity measure score for each similarity measure for each pair of attributes. For example, the server system uses any mix of similarity measures. Using a simple example, the following table shows a probable pair of places Place 1 and Place 2:

| Attributes | Place 1 | Place 2 |
|---|---|---|
| Name | Buckeye Pizza | Marathon (Buckeye Pizza) |
| Address | 1584 Summit St, Columbus | Summit St, Columbus |
| Category | Pizza | Gas Station |
| Provider | Provider X | Provider Y |
| Lat/Lng | 39.9951750/-83.0010930 | 39.9951360/-83.0012341 |
| . . . | | |

In the above simple example, the server system uses the following similarity measures: a street name match score, a street number match score, a semantic name matching score, and a distance score. Accordingly, the server system generates a street name match score, a street number match score, a semantic name matching score, and a distance score using the associated attributes for each place in the pair. For example, for the street name match score, the server system compares the street name in the address attribute of the first place and the street name in the address attribute of the second place to generate the street name match score; for the street number match score, the server system compares the street number in the address attribute of the first place and the street number in the address attribute of the second place to generate the street number match score; for the semantic name matching score, the server system compares the place name attribute of the first place and the place name attribute of the second place to generate the semantic name matching score; for the distance score, the server system compares the Lat/Long attribute (e.g., latitude/longitude coordinates) of the first place and the Lat/Long attribute of the second place to generate the distance score, and so forth. Further details about specific similarity measures are described below.

In operation 504, the server system generates an overall similarity score for each pair of places. In one example embodiment, the server system generates the overall similarity score for each pair of places by adding up the individual similarity score for each similarity measure and using weights for each score to determine the overall similarity score. For example, some similarity measures may be a stronger indication of the similarity between the two places. The weights may be predetermined for each similarity measure and may be updated/modified to achieve different results.

Figure 6:
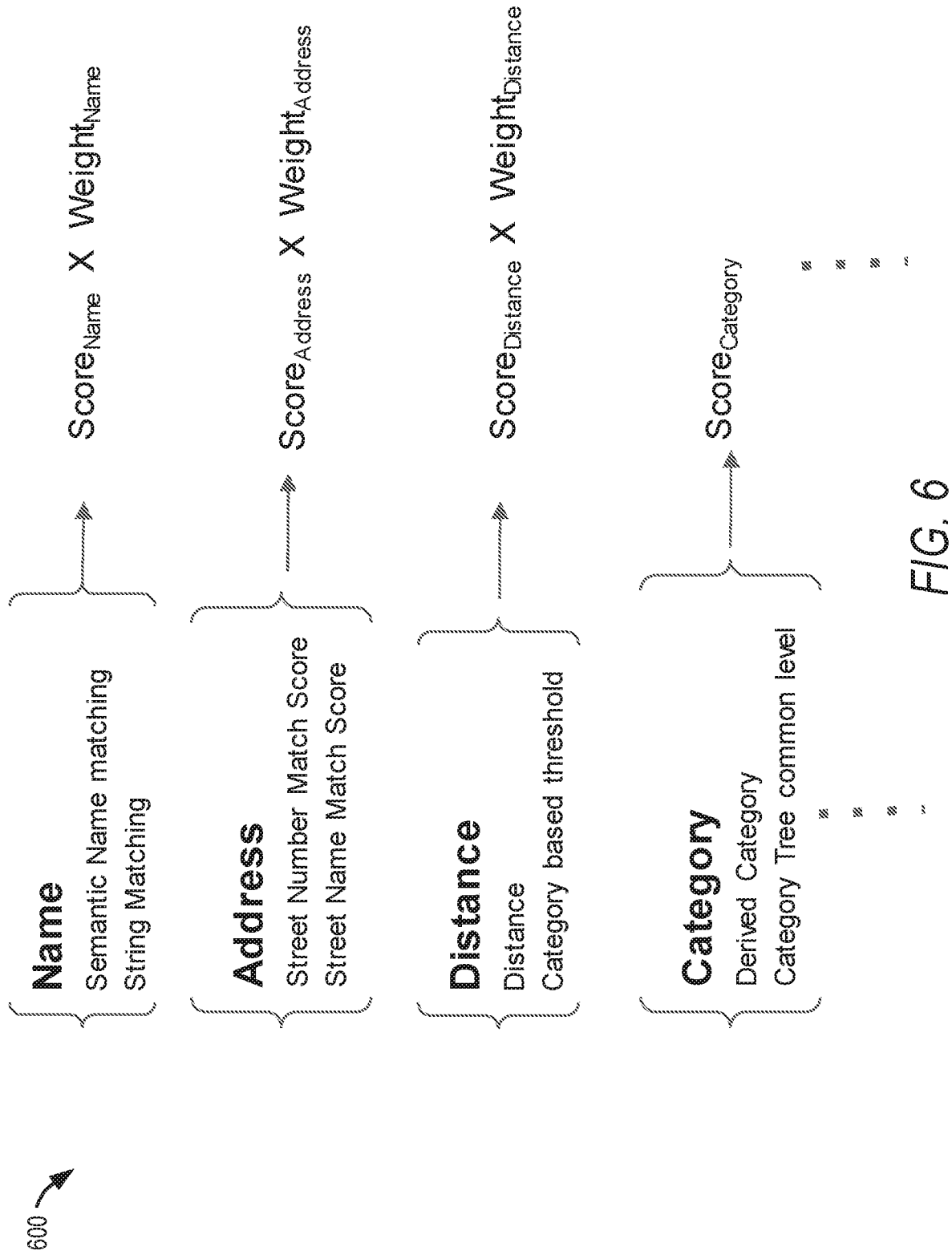
FIG. 6 illustrates an example of a rule-based combiner to generate an overall similarity score, according to some example embodiments.

FIG. 6 illustrates an example of a rule-based combiner 600 to generate an overall similarity score. In this example, the weighted sum of the feature (e.g., similarity measure) scores is the overall similarity score. The weights may be adjusted by heuristics. The pair of places are considered a match if the overall similarity score is greater than or equal to a predetermined threshold.

Figure 7:
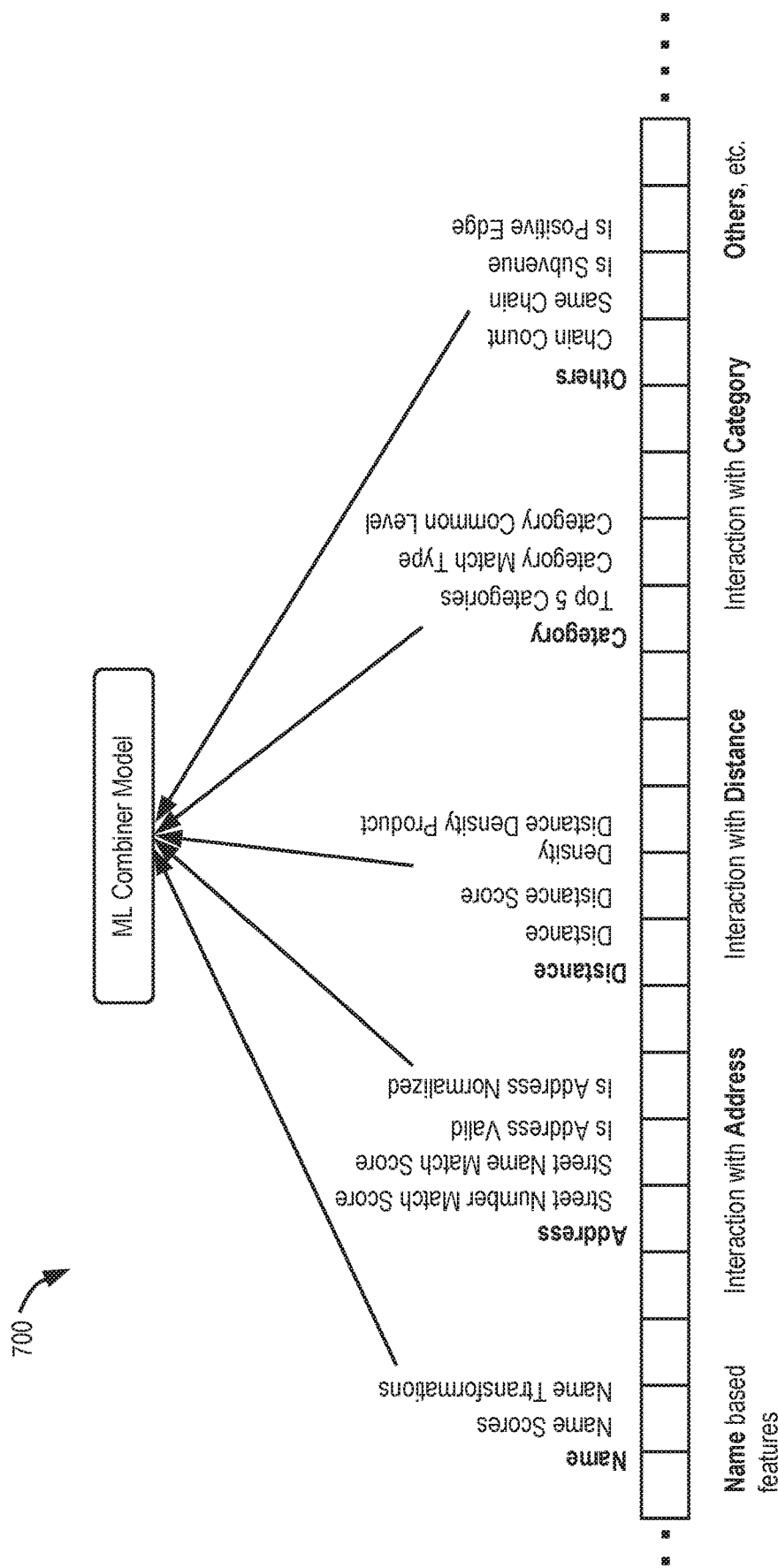
FIG. 7 illustrates an example of a machine learning-based combiner to generate an overall similarity score, according to some example embodiments.

In another example embodiment, a machine learning model is trained and then used to predict the similarity based on the individual similarity measures. For example, training data is generated by preparing labeled pairs indicating whether they are similar or not similar. The training data is used to train a machine learning model to generate an overall similarity score (e.g., between 0 and 1). For example, all the desired signals (e.g., similarity measures) may be combined to model as a feature vector and fed into the machine learning model. Example methods that may be used for a machine learning model may include logistic regression, Support Vector Machine (SVM), Random Forest, or other method. Each probable pair is fed into the trained machine learning model to generate an overall similarity score for each pair. FIG. 7 illustrates an example 700 of a machine learning-based combiner to generate an overall similarity score.

Figure 8:
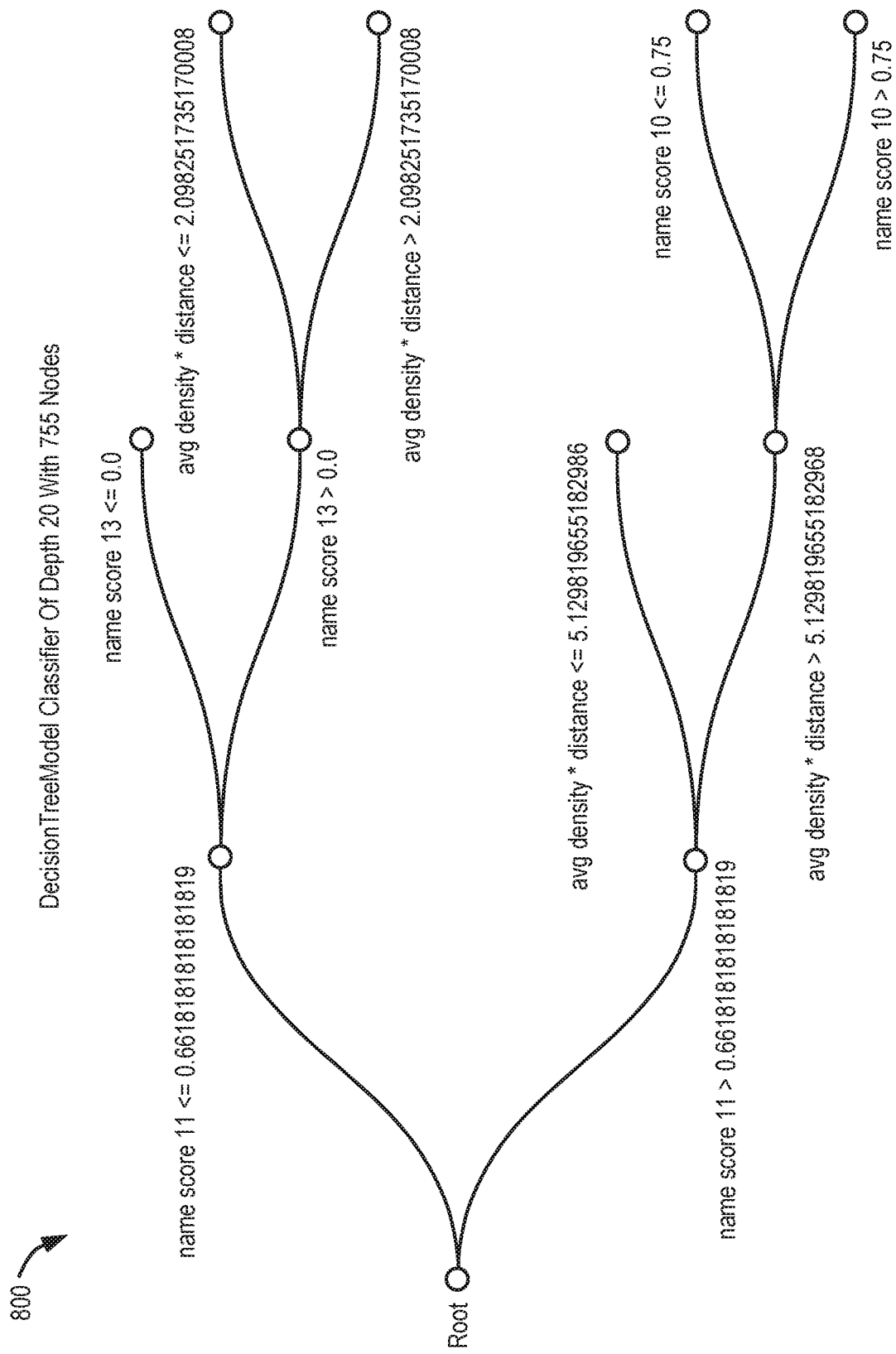
FIG. 8 shows an example visualization of a tree using a Random Forest method, according to some example embodiments.

In one example, a Random Forest method is used for the machine learning model. In this method, data is recursively split in a feature space to maximize information gain. A match probability=number of votes/number of decision trees. FIG. 8 shows an example visualization 800 of a tree using the Random Forest method. In this example, only the top three levels are shown for ease of visibility.

In one embodiment, using 63,385 records with 53,557 (84.49%) positive examples, 9,828 (15.51%) negative examples, the results are shown in the table below.

| Method | Precision | Recall |
| --- | --- | --- |
| Rule-Based | 98.7% | 90.6% |
| Logistic Regression | 99% | 91.15% |
| SVM | 99% | 84.75% |
| Random Forest | 99% | 93% |

Returning to FIG. 5, in operation 506, the server system determines whether the overall similarity score for each pair of places is larger than a predetermined threshold. In operation 508, the server system determines that a pair of places match (e.g., point to the same place) based on determining that the overall similarity score for the pair of places is larger than a predetermined threshold. If the overall similarity score for the pair of places is less than the predetermined threshold, the server system does not consider them a match.

Returning to FIG. 4, in operation 410, the server system generates the similar pairs based on the combined similarity measures. For example, the server system determines which pairs are similar based on the overall similarity score as described above.

In operation 412, the server system converts the similar pairs into connected components comprising groups of similar places. In this operation, the server system is determining which pairs of similar places may be grouped together as a single group of places all associated with the same place. In one example, this may be based on the best similar edge from all the candidates for a group of similar places.

Figure 9:
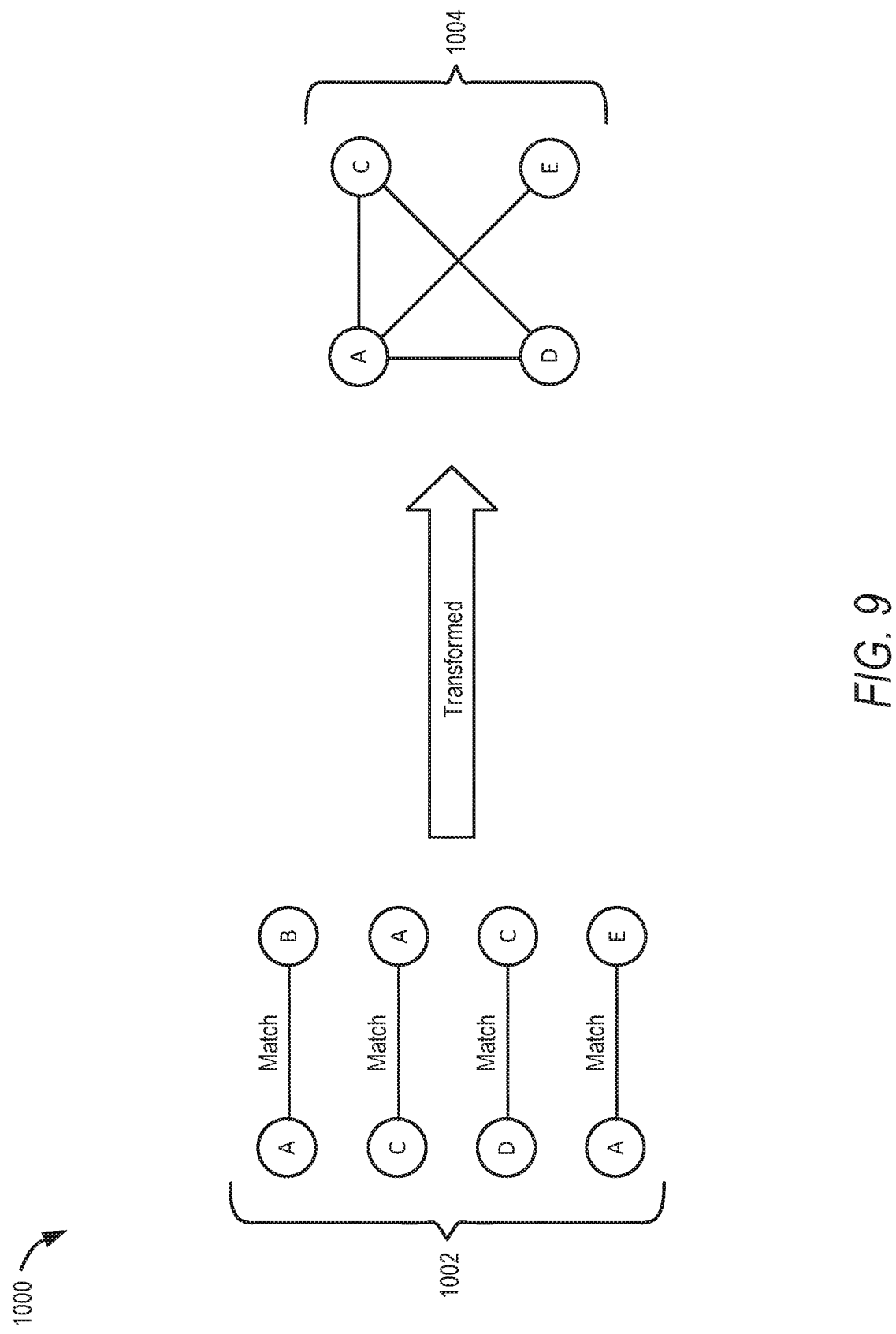
FIG. 9 illustrates an example of transforming best matches to connected components, according to some example embodiments.

The server system then takes the best matches (e.g., the pairs with the best similar edge, which is based on highest overall similarity scores) and transforms them into connected components comprising groups of similar places based on the best similar edge from all the candidates for a group of similar places. In one example, the similar pairs are converted into connected components comprising groups of similar places based on the best similar edge from all the candidates for a group of similar places using a distributed connected competence analysis. In one example, computing connected components are done using a Hash-to-Min or other Map-Reduce or similar algorithm. FIG. 9 illustrates an example 1000 of transforming the best matches 1002 to connected components 1004.

In one example embodiment, the server system analyzes the connected components (e.g., such as the connected components 1004) to determine whether there are any negative edges that should be broken. For example, two places may have a very high overall similarity score but are not in fact the same place. One example may be a venue and sub-venue, such as a gas station with a convenience store. These places may be at the same location, have similar attributes, but should actually be considered separate places. Another example is a coffee shop (e.g., Starbucks) that may have two locations on the same block. The server system traverses each group of similar places (e.g., each pair in the connected components comprising groups of similar places) to determine negative edges and removes the negatives edges from the connected components (e.g., from the group of similar places). In one example, the negative edges are determined using data indicating that the places should be separate places. For instance, the server system accesses one or more data stores (e.g., database(s) 126 or other data sources) to access data identifying venues and sub-venues, chains (e.g., Starbucks or other chains), and so forth.

Figure 10:
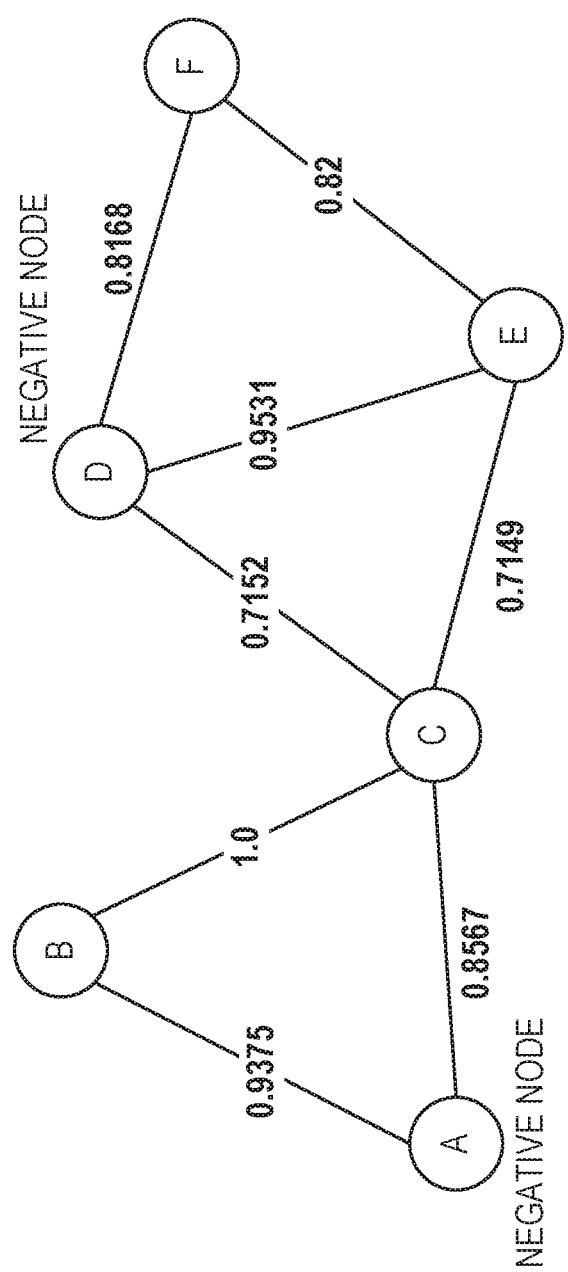
FIGS. 10-20 illustrate an example of how negative edges are removed from connected components, according to some example embodiments.
Figure 11:
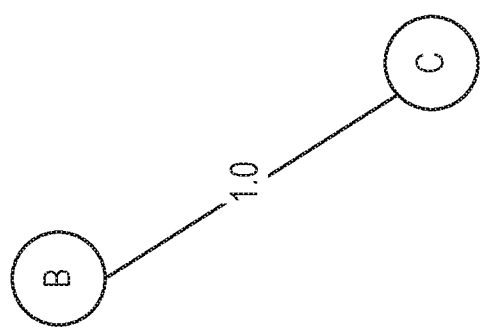
Figure 12:
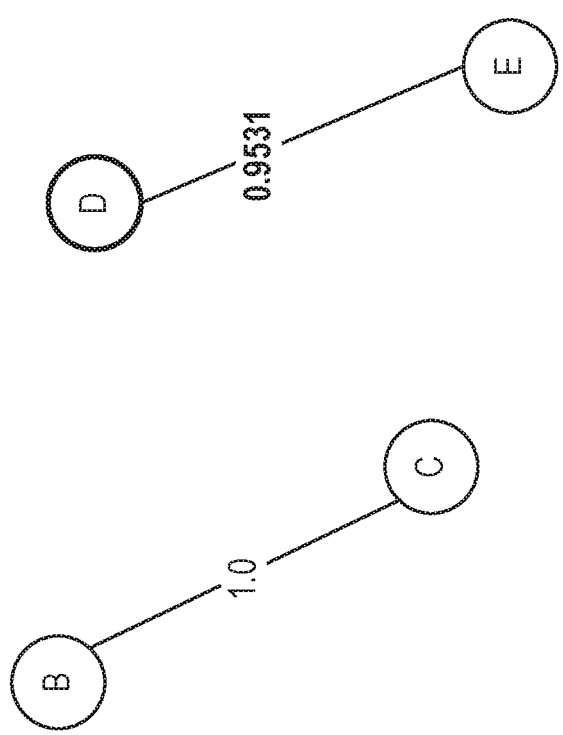
Figure 13:
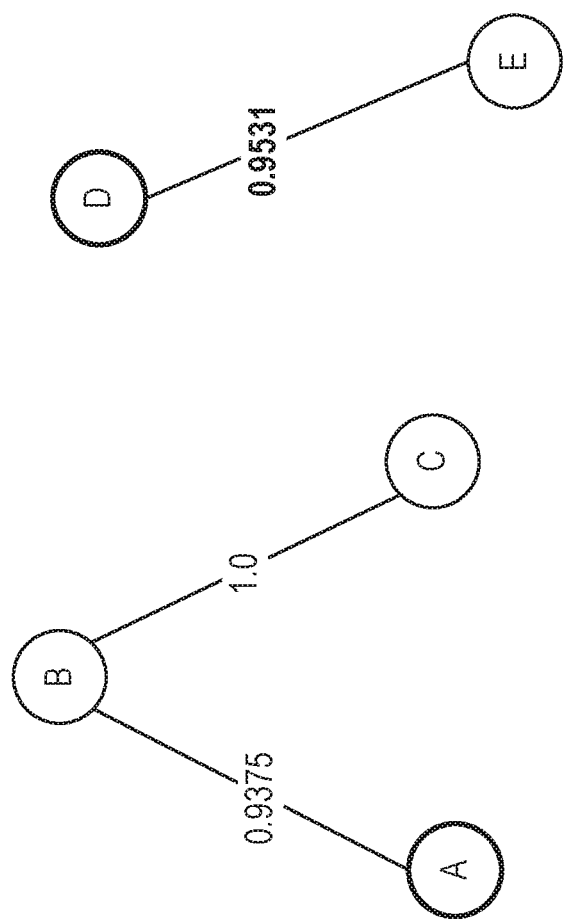
Figure 14:
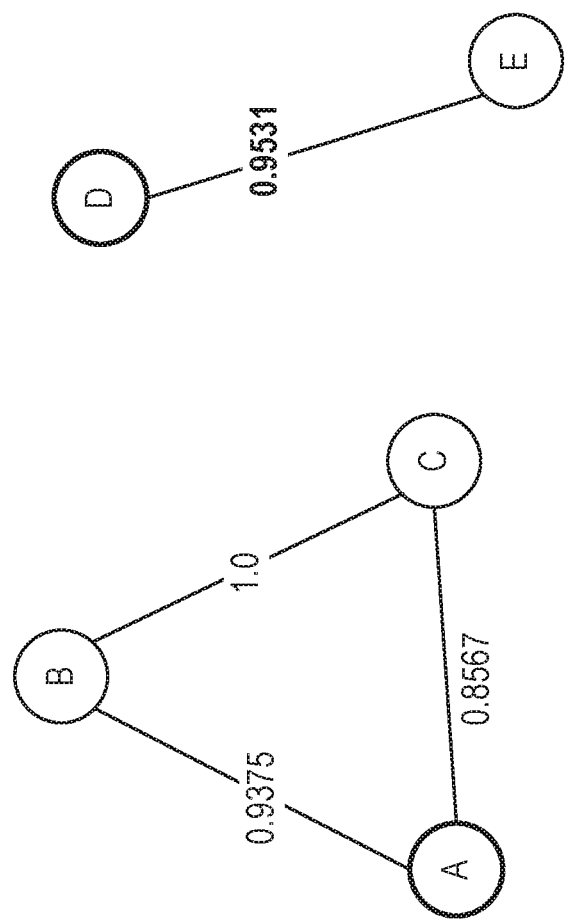
Figure 15:
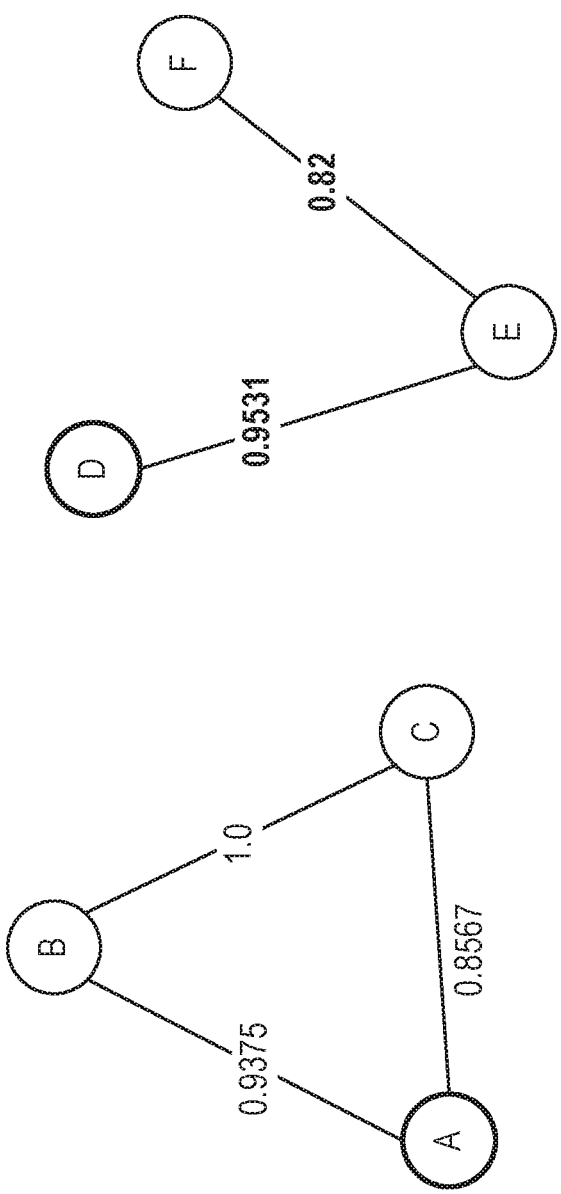
Figure 16:
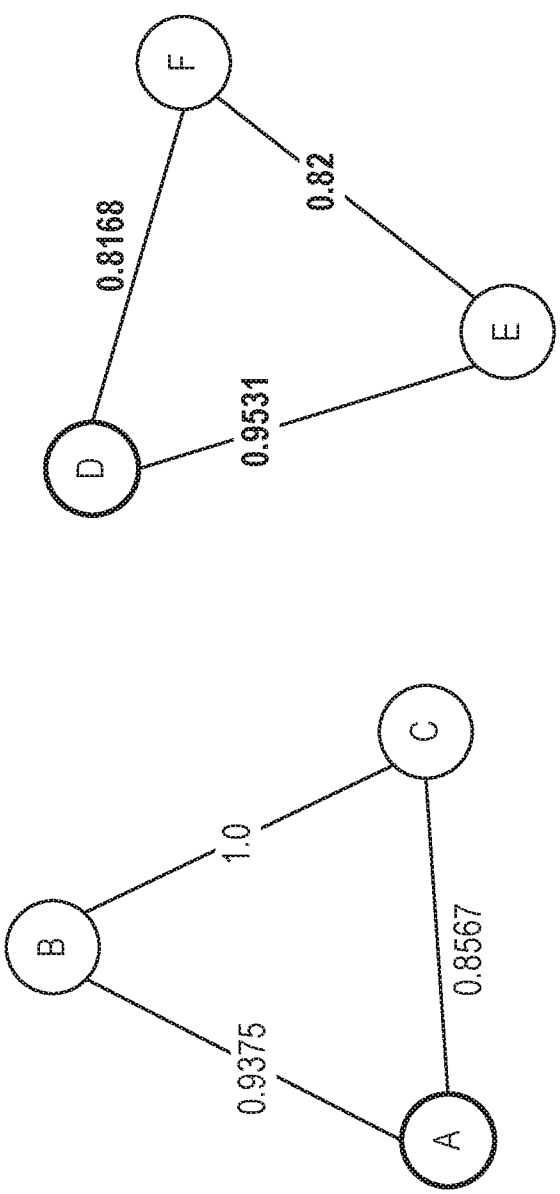

FIGS. 10-20 illustrate an example of how negative edges are removed from connected components. FIG. 10 shows an example of connected components comprising a group of similar places A-F. Nodes A and D are identified as negative nodes (e.g., based on accessing data indicating that A and D should be separate places and not grouped as the same place). The server system first sorts the edges from highest to lowest score. For example, the pair or edge B-C has a highest score of 1.0, the pair or edge D-E has a next highest score of 0.9531, and so forth. The server system then adds each pair/edge starting with the pair/edge with the highest score. In this example, pair B-C is added first, as shown in FIG. 11, and then pair D-E is added as shown in FIG. 12. Next, pair A-B is added as shown in FIG. 13, pair A-C is added as shown in FIG. 14, pair E-F is added as shown in FIG. 15, and pair D-F is added as shown in FIG. 16. So far, none of the pairs added connect the negative nodes.

Figure 17:
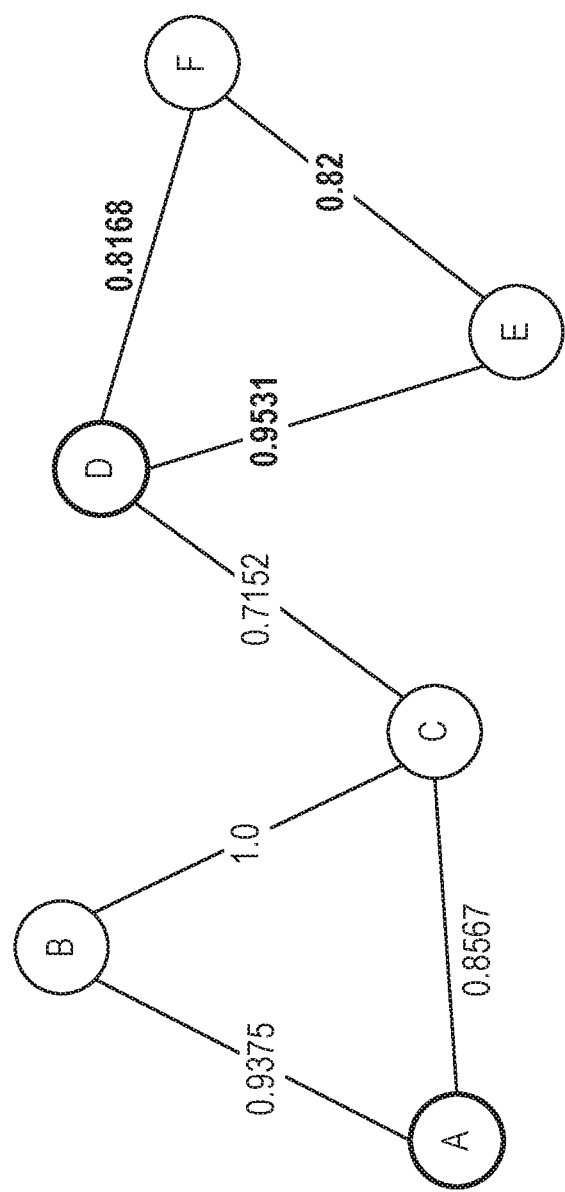
Figure 18:
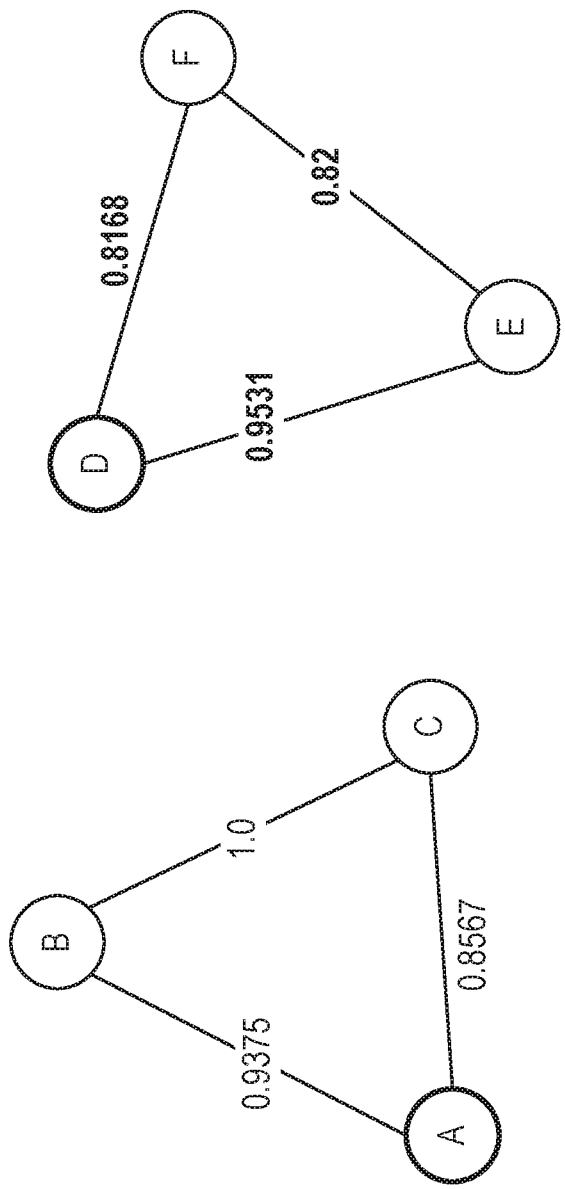
Figure 19:
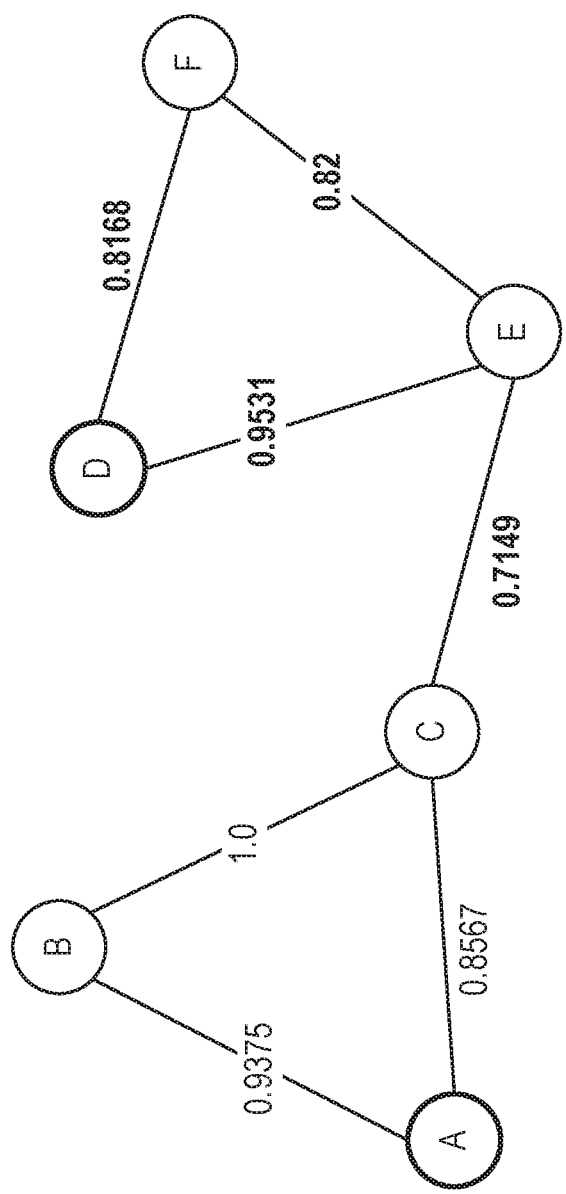
Figure 20:
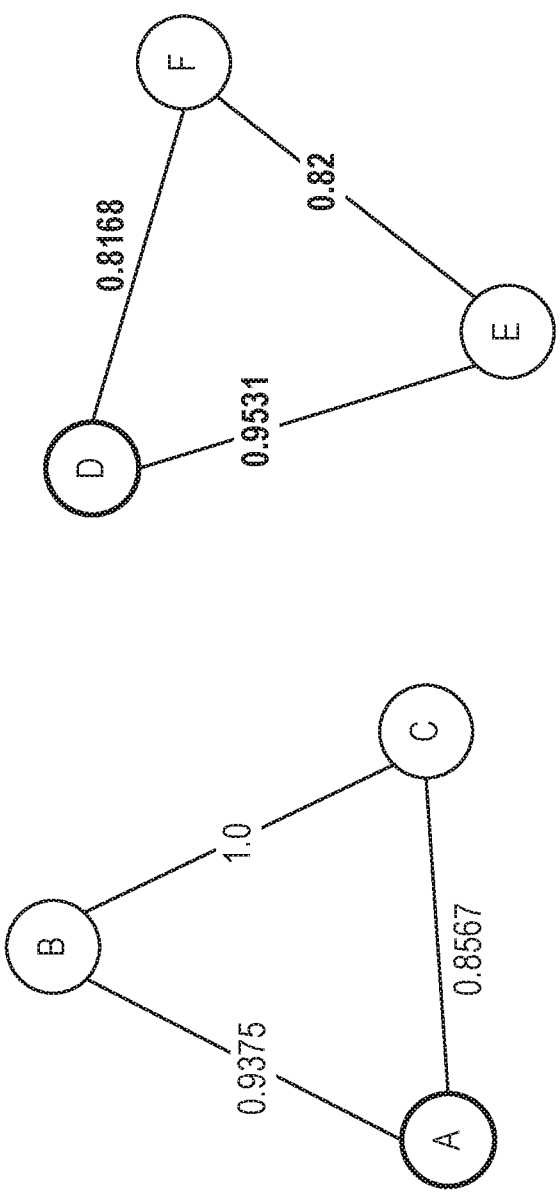

Next, pair C-D is added as shown in FIG. 17. Now the server system determines that negative node A and negative node D are connected (via node C), when they should not be connected. Thus, the server system deletes the pair C-D which results in the connected components shown in FIG. 18. Next, pair C-E is added as shown in FIG. 19. Again, the server system determines that negative node A and negative node D are connected (via nodes C and E), and negative node A and negative node D should not be connected. Thus, the server system deletes the pair C-E, which results in the connected components shown in FIG. 20. Thus, the original connected components of FIG. 10 are now two separate groups of connected components as shown in FIG. 20.

In one embodiment, negative edges are removed as part of post-processing of the connected components (e.g., grouped places), as described above with respect to the post processing layer 222 of FIG. 2

The connected components comprising groups of matched places may be used to generate a single record for the place. All of the attributes except for the geocoordinates (e.g., latitude/longitude) for the place are extracted from a preferred provider in the matched group. For the latitude/longitude, various signals from all of the matched providers are taken, including the reverse geocodes, cross streets, building footprints, and so forth, to generate the correct latitude/longitude for the place.

As explained above, specific similarity measures are used in calculating the overall or combined similarity score as described with respect to FIG. 5. One example of a similarity measure is a semantic name matching score. Name matching generally refers to finding a similarity between two names. For example, a first source may have place data for "Spa at Four Seasons Hotel Philadelphia, 1 Logan Sq, Philadelphia, Pa." and a second source may have place data for "Four Seasons Hotel Philadelphia, 1 Logan Square, Philadelphia, Pa. 19103, United States." Example embodiments determine whether the place name from the first source "Spa at Four Seasons Hotel Philadelphia" is for the same place as the place name from the second source "Four Seasons Hotel Philadelphia." In this example, the Spa and the Hotel are likely two separate places. But this would be difficult to determine based on just a text match since just a text match may indicate that they are the same place. In another example, a first source may have place data for "PFM Truck, 1402 W Hanna Ave, Indianapolis, Ind." and a second source may have place data for "PFM Truck & Car Care Center, 1402 W. Hanna Avenue, Indianapolis, Ind. 46217, United States." A text match may indicate that these are different places because the difference in text appears to be large, even though these names are likely for the same place. Accordingly, a text match alone may not be sufficient to determine a match between places from two different sources.

Example embodiments use a variety of methods to generate a semantic name matching score. These include understanding chains (e.g., businesses with multiple locations, such as Starbucks, Walmart, Target, Safeway, Shell, Taco Bell, etc.), understanding category terms in a place name, understanding location identifiers in a place name, alias generation, and so forth. Using these understandings, a dictionary can be generated that includes chains, categories, location identifiers, aliases, and so forth to be used to transform a place name to determine whether or not it is similar to another place name.

Chains include entities with multiple locations, as explained above, and may include sub-chains, co-venues, sub-venues, place names with the host venue in the name, and so forth. An example of a chain may be Target and a sub-chain may be Target Pharmacy. Another example of a chain may be Walmart and a sub-chain may be Walmart Distribution Center. Examples of co-venues include Taco Bell and KFC, Hardee's and Red Burrito, and Dunkin' Donuts and Baskin Robbins. Examples of sub-venues include Taco Bell parking lot and Walgreens drive-through. Examples of a host venue in a place name include McDonald's in Walmart, Pizza Hut in Target, and Redbox in 7-Eleven.

Categories relate to a type of place, such as school, church, café, coffee shop, restaurant, bar, night club, park, airport, gas station, store, grocery, and so forth. For example, a category included in the place name "The Happy Café" is café and a category included in the place name "Shell Gas Station" is gas station.

Location identifiers relate to location information in a place name, such as a city name, a state name, a street name, and the like. For example, in the place names "DMV Albany" and "Valley Vista High School California" the location identifiers may include "Albany" and "California" respectively.

Aliases refer to variations of a name for the same place. Some examples of aliases include abbreviations (e.g., DMV for Department of Motor vehicles, or Dept. for Department), variations in names (e.g., SFO and San Francisco International Airport, automotive and auto, cafeteria and café, gymnasium and gym, laboratory and lab), and so forth. Alias generation may include heuristic-based rules to normalize tokens (e.g., "gym" as a normalized form of "gymnasium"), stop word/phrase removal (e.g., removal of "a," "an," "the," and other qualifier and also stop words such as "place, shop, house, mall, ltd, co, inc,"), word-to-number conversions (e.g., "Seven Eleven" to "7 11), abbreviations (e.g., Department of Motor Vehicles and DMV), special character handling (e.g., non-ascii characters), pattern-based rules, addition/removal of spaces, stemming, and so forth.

For example, the server system can take a first place name, "Hidden Valley School California," and a second place name, "Hidden Valley Elementary School," and use the generated dictionary to transform each place name to remove category information, such as "school" and "elementary school," and remove location identifiers, such as "California." Now when the two place names are compared (e.g., "Hidden Valley" and "Hidden Valley"), it is clear that they correspond to the same place. Likewise, when "Starbucks Café Shop" and "Starbucks Coffee Shop" are transformed to remove categories (e.g., "Café Shop" and "Coffee Shop"), the two names "Starbucks" and "Starbucks" likely indicate the same place. In this case, these are part of a known chain (Starbucks), which can also be used to determine whether they are the same place or not. In another example, two place names may be "Dept. of Motor Vehicles Pleasant Hill" and "DMV Pleasant Hill." In this case if the location identifier (Pleasant Hill) is removed, the transformed place name "Dept. of Motor Vehicles" and "DMV" may indicate different places; however, if an alias dictionary is used, it will be clear that "Dept. of Motor Vehicles" is the same as "DMV."

After the server system transforms the place name for a comparison, the server system compares the place names to generate a semantic name similarity score for the two place names. This semantic name similarity score can then be used as one of the similarity measures or scores used for generating an overall similarity score for a pair of places as explained above. For example, once the server system has generated different variations of the place name using transformations described above, the server system uses a string based matching algorithm (e.g., Jaro-Winkler distance, Levenshtein distance, or the like) to generate a score and select the best matching score as the final score.

Another example of a similarity measure is a category matching score. A category matching score indicates how closely a category for a first place matches a category of a second place. Place data from multiple sources may include category information. The category information, however, varies across sources. For example, one source may have only one level of category per place (e.g., restaurant or gas station), another source may have multiple levels of categories per place (e.g., food→African restaurant→Ethiopian restaurant), and the names of the categories may differ between sources (e.g., one source uses Food, another source uses Restaurants), and some categories may be incorrect. Moreover, each source may have hundreds of categories. In one example embodiment, a category tree is generated by mapping category trees from different sources into one category tree. The generated category tree comprises a single schema providing a common representation of categories.

To generate the category matching score, the server system may compare one or more categories for a first place with one or more categories of a second place, using the generated category tree, to generate a score indicating how similar the one or more categories for the first place are to the one or more categories of the second place. For example, two categories are more similar if they are from the same category (e.g., restaurant) or a subcategory of the same category (e.g., bar and restaurant) in the generated category tree, and less similar or not similar if they belong to different categories or sub-categories (e.g., restaurant and gas station) in the generated category tree. In one example, the server system determines a common ancestor for both places in the generated category tree and then generates the category matching score based on the common ancestor. For example, a positive or negative boost based on the level on which the common ancestor lies may be assigned heuristically. For instance, if the common ancestor is at the top of the category tree, the categories are very different, and the penalty should be −1.0. As we go down in the tree, the penalty can keep decreasing by half. And if the common ancestor is at the bottom of the tree, 3 level down, the penalty can be −1.0/8 (e.g., −0.125).

The following examples describe various embodiments of methods, machine-readable media, and systems (e.g., machines, devices, or other apparatus) discussed herein.

Example 1

A computer-implemented method comprising:
generating, by a server system, a places dataset comprising place data from multiple data sources each having a plurality of place data;
based on the places dataset, generating, by the server system, local clusters comprising places located within a predetermined distance;
generating, by the server system, probable pairs of places in each local cluster;
distributing, by the server system, the probable pairs to one or more processors to determine similar edges between one or more places in each local cluster based on a plurality of combined similarity measures indicating whether or not a place is similar to another place;
generating, by the server system, similar pairs based on the combined similarity measures; and
converting, by the server system, the similar pairs into connected components comprising groups of similar places based on a best similar edge from all the candidates for a group of similar places.

Example 2

A method according to example 1, wherein generating the places dataset comprises processing the place data from the multiple data sources to transform the place data into a common format.

Example 3

A method according to any of the previous examples, wherein processing the place data from the multiple data sources to transform the place data into a common format further comprises performing at least one of a group comprising: data cleanup, filtering, parsing, and annotation.

Example 4

A method according to any of the previous examples, wherein the places located within the predetermined distance comprise places located within a cell of a predetermined size.

Example 5

A method according to any of the previous examples, wherein the places located within the predetermined distance further comprise places located within one or more neighboring cells of the cell.

Example 6

A method according to any of the previous examples, wherein determining probable pairs comprises at least one of a group comprising: determining each place in each local cluster has at least one common token with another place in the local cluster, determining each place is within a predetermined distance, and determining that a name of a place can be transformed to match at least one other place in the local cluster.

Example 7

A method according to any of the previous examples, wherein the similar pairs are converted into connected components comprising groups of similar places based on the best similar edge from all the candidates for the group of similar places using Hash-to-Min.

Example 8

A method according to any of the previous examples, wherein the similar pairs are converted into connected components comprising groups of similar places based on the best similar edge from all the candidates for the group of similar places using a distributed connected competence analysis.

Example 9

A method according to any of the previous examples, further comprising:
traversing each group of similar places to determine negative edges; and
removing negative edges from the group.

Example 10

A method according to any of the previous examples, wherein determining similar edges between one or more places in each local cluster based on the plurality of combined similarity measures indicating whether or not a place is similar to another place comprises:
generating a similarity measure score for each similarity measure for each pair of places;
generating an overall similarity score for each pair of places based on a weight associated with each similarity measure score;
determining whether the overall similarity score for each pair of places is larger than a predefined threshold; and
determining that a pair of places is matched based on the overall similarity score for the pair being larger than the predefined threshold.

Example 11

A server computer comprising:
a memory that stores instructions; and
one or more processors configured by the instructions to perform operations comprising:
generating a places dataset comprising place data from multiple data sources each having a plurality of place data;
based on the places dataset, generating local clusters comprising places located within a predetermined distance;
generating probable pairs of places in each local cluster;
distributing the probable pairs to one or more processors to determine similar edges between one or more places in each local cluster based on a plurality of combined similarity measures indicating whether or not a place is similar to another place;
generating similar pairs based on the combined similarity measures; and
converting the similar pairs into connected components comprising groups of similar places based on a best similar edge from all the candidates for a group of similar places.

Example 12

A server computer according to any of the previous examples, wherein generating the places dataset comprises processing the place data from the multiple data sources to transform the place data in a common format by performing at least one of a group comprising: data cleanup, filtering, parsing, and annotation.

Example 13

A server computer according to any of the previous examples, wherein the places located within the predetermined distance comprise places located within a cell of a predetermined size.

Example 14

A server computer according to any of the previous examples, wherein the places located within the predetermined distance further comprise places located within one or more neighboring cells of the cell.

Example 15

A server computer according to any of the previous examples, wherein determining probable pairs comprises at least one of a group comprising: determining each place in each local cluster has at least one common token with another place in the local cluster, determining each place is within a predetermined distance, and determining that a name of a place can be transformed to match at least one other place in the local cluster.

Example 16

A server computer according to any of the previous examples, wherein the similar pairs are converted into connected components comprising groups of similar places based on the best similar edge from all the candidates for the group of similar places using Hash-to-Min.

Example 17

A server computer according to any of the previous examples, wherein the similar pairs are converted into connected components comprising groups of similar places based on the best similar edge from all the candidates for the group of similar places using a distributed connected competence analysis.

Example 18

A server computer according to any of the previous examples, the operations further comprising:
traversing each group of similar places to determine negative edges; and
removing negative edges from the group.

Example 19

A server computer according to any of the previous examples, wherein determining similar edges between one or more places in each local cluster based on the plurality of combined similarity measures indicating whether or not a place is similar to another place comprises:
generating a similarity measure score for each similarity measure for each pair of places;
generating an overall similarity score for each pair of places based on a weight associated with each similarity measure score;
determining whether the overall similarity score for each pair of places is larger than a predefined threshold; and
determining that a pair of places is matched based on the overall similarity score for the pair being larger than the predefined threshold.

Example 20

A computer-readable medium comprising instructions stored thereon that are executable by at least one processor to cause a computing device to perform operations comprising:
generating a places dataset comprising place data from multiple data sources each having a plurality of place data;
based on the places dataset, generating local clusters comprising places located within a predetermined distance;

generating probable pairs of places in each local cluster;

distributing the probable pairs to one or more processors to determine similar edges between one or more places in each local cluster based on a plurality of combined similarity measures indicating whether or not a place is similar to another place;

generating similar pairs based on the combined similarity measures; and converting the similar pairs into connected components comprising groups of similar places based on a best similar edge from all the candidates for a group of similar places.

Figure 21:
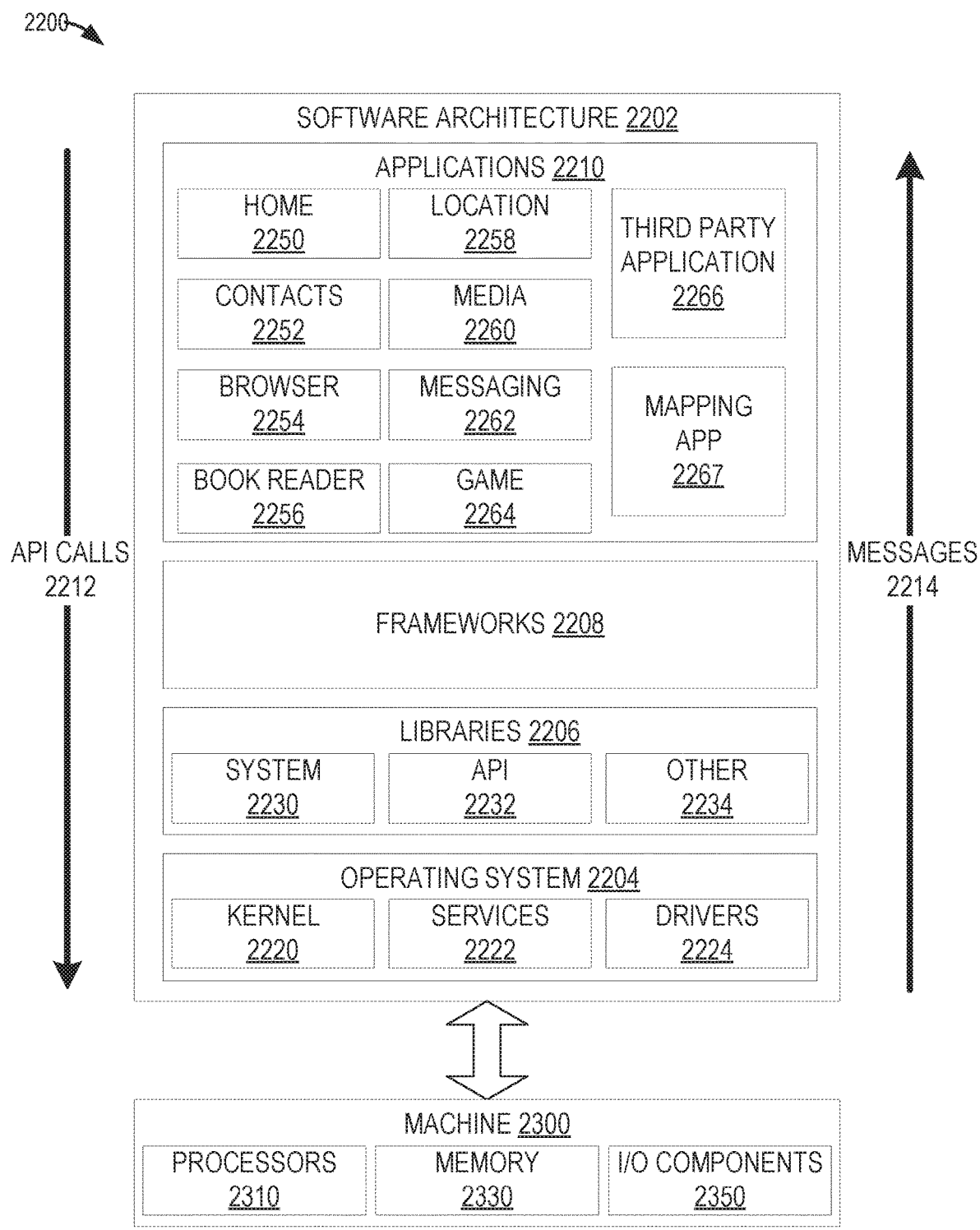
FIG. 21 is a block diagram illustrating an example of a software architecture that may be installed on a machine, according to some example embodiments.

FIG. 21 is a block diagram 2200 illustrating software architecture 2202, which can be installed on any one or more of the devices described above. For example, in various embodiments, client devices 110 and servers and systems 130, 102, 120, 122, and 124 are implemented using some or all the elements of software architecture 2202. FIG. 21 is merely a non-limiting example of a software architecture, and it will be appreciated that many other architectures can be implemented to facilitate the functionality described herein. In various embodiments, the software architecture 2202 is implemented by hardware such as machine 2300 of FIG. 22 that includes processors 2310, memory 2330, and I/O components 2350. In this example, the software architecture 2202 can be conceptualized as a stack of layers where each layer may provide a particular functionality. For example, the software architecture 2202 includes layers such as an operating system 2204, libraries 2206, frameworks 2208, and applications 2210. Operationally, the applications 2210 invoke application programming interface (API) calls 2212 through the software stack and receive messages 2214 in response to the API calls 2212, consistent with some embodiments.

In various implementations, the operating system 2204 manages hardware resources and provides common services. The operating system 2204 includes, for example, a kernel 2220, services 2222, and drivers 2224. The kernel 2220 acts as an abstraction layer between the hardware and the other software layers, consistent with some embodiments. For example, the kernel 2220 provides memory management, processor management (e.g., scheduling), component management, networking, and security settings, among other functionality. The services 2222 can provide other common services for the other software layers. The drivers 2224 are responsible for controlling or interfacing with the underlying hardware, according to some embodiments. For instance, the drivers 2224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2206 provide a low-level common infrastructure utilized by the applications 2210. The libraries 2206 can include system libraries 2230 (e.g., C standard library) that can provide functions such as memory allocation functions, string manipulation functions, mathematic functions, and the like. In addition, the libraries 2206 can include API libraries 2232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 2206 can also include a wide variety of other libraries 2234 to provide many other APIs to the applications 2210.

The frameworks 2208 provide a high-level common infrastructure that can be utilized by the applications 2210, according to some embodiments. For example, the frameworks 2208 provide various graphic user interface (GUI) functions, high-level resource management, high-level location services, and so forth. The frameworks 2208 can provide a broad spectrum of other APIs that can be utilized by the applications 2210, some of which may be specific to a particular operating system 2204 or platform.

In an example embodiment, the applications 2210 include a home application 2250, a contacts application 2252, a browser application 2254, a book reader application 2256, a location application 2258, a media application 2260, a messaging application 2262, a game application 2264, and a broad assortment of other applications such as a third-party application 2266. According to some embodiments, the applications 2210 are programs that execute functions defined in the programs. Various programming languages can be employed to create one or more of the applications 2210, structured in a variety of manners, such as object-oriented programming languages (e.g., Objective-C, Java, or C++) or procedural programming languages (e.g., C or assembly language). In a specific example, the third-party application 2266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2266 can invoke the API calls 2212 provided by the operating system 2204 to facilitate functionality described herein.

Some embodiments may particularly include a mapping application 2267. In certain embodiments, this may be a stand-alone application that operates to manage communications with a server system such as third-party servers 130 or server system 102. In other embodiments, this functionality may be integrated with another application. The mapping application 2267 may request and display various data related to maps and navigation, places, and so forth, and may provide the capability for a user 106 to input data related to the objects via a touch interface, keyboard, or using a camera device of machine 2300, communication with a server system via I/O components 2350, and receipt and storage of object data in memory 2330. Presentation of information and user inputs associated with the information may be managed by the mapping application 2267 using different frameworks 2208, library 2206 elements, or operating system 2204 elements operating on a machine 2300.

Figure 22:
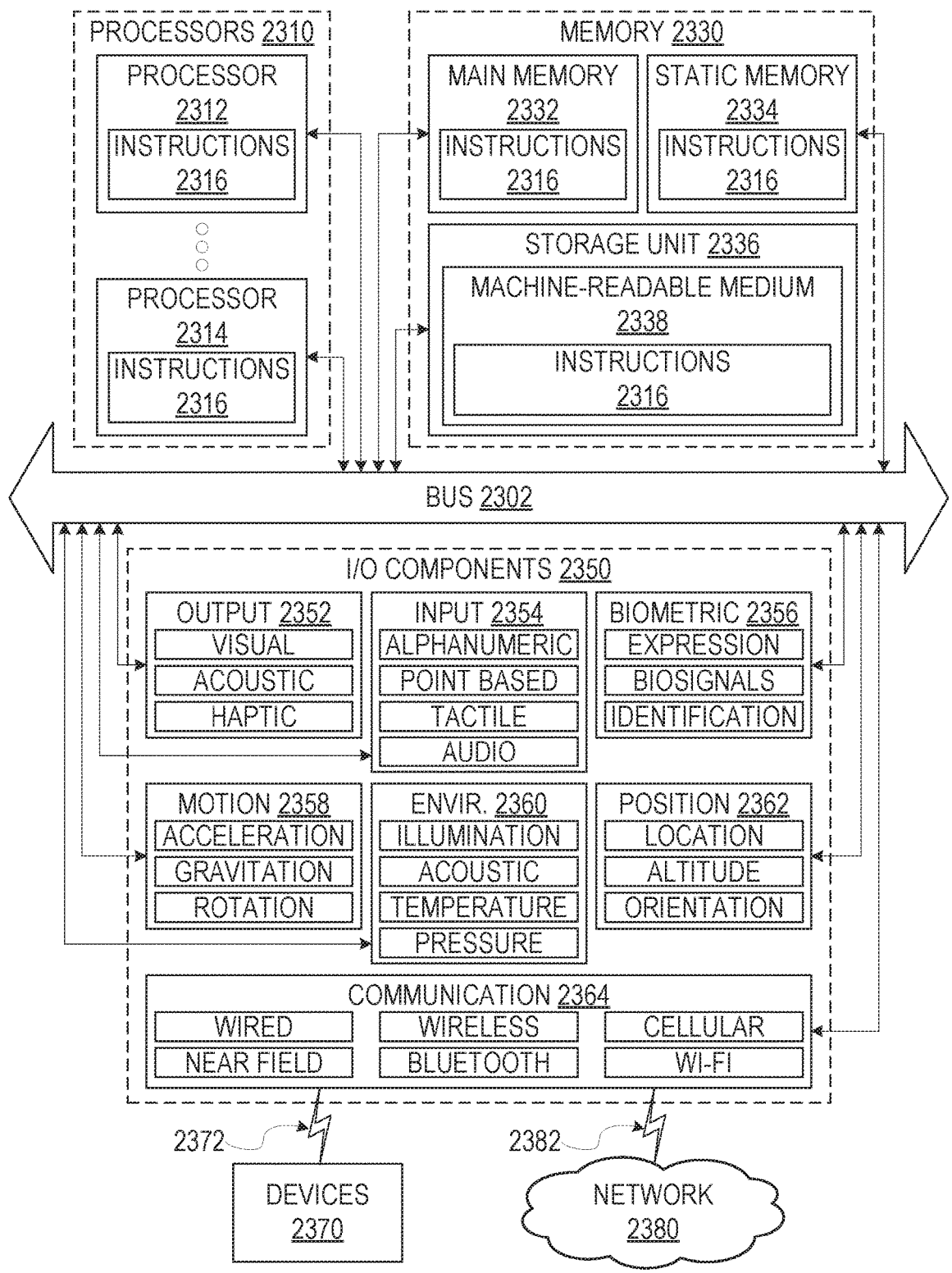
FIG. 22 illustrates a diagrammatic representation of a machine, in the form of a computer system, within which a set of instructions may be executed for causing the machine to perform any one or more of the methodologies discussed herein, according to an example embodiment.

FIG. 22 is a block diagram illustrating components of a machine 2300, according to some embodiments, able to read instructions from a machine-readable medium (e.g., a machine-readable storage medium) and perform any one or more of the methodologies discussed herein. Specifically, FIG. 22 shows a diagrammatic representation of the machine 2300 in the example form of a computer system, within which instructions 2316 (e.g., software, a program, an application 2210, an applet, an app, or other executable code) for causing the machine 2300 to perform any one or more of the methodologies discussed herein can be executed. In alternative embodiments, the machine 2300 operates as a standalone device or can be coupled (e.g., networked) to other machines. In a networked deployment, the machine 2300 may operate in the capacity of a server machine or system (e.g., servers 130, 102, 120, 122, 124), or a client device 110 in a server-client network environment, or as a peer machine in a peer-to-peer (or distributed) network environment. The machine 2300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2316, sequentially or otherwise, that specify actions to be taken by the machine 2300. Further, while only a single machine 2300 is illustrated, the term "machine" shall also be taken to include a collection of machines 2300 that individually or jointly execute the instructions 2316 to perform any one or more of the methodologies discussed herein.

In various embodiments, the machine 2300 comprises processors 2310, memory 2330, and I/O components 2350, which can be configured to communicate with each other via a bus 2302. In an example embodiment, the processors 2310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 2312 and a processor 2314 that may execute the instructions 2316. The term "processor" is intended to include multi-core processors 2310 that may comprise two or more independent processors 2312, 2314 (also referred to as "cores") that can execute instructions 2316 contemporaneously. Although FIG. 23 shows multiple processors 2310, the machine 2300 may include a single processor 2310 with a single core, a single processor 2310 with multiple cores (e.g., a multi-core processor 2310), multiple processors 2312, 2314 with a single core, multiple processors 2312, 2314 with multiples cores, or any combination thereof.

The memory 2330 comprises a main memory 2332, a static memory 2334, and a storage unit 2336 accessible to the processors 2310 via the bus 2302, according to some embodiments. The storage unit 2336 can include a machine-readable medium 2338 on which are stored the instructions 2316 embodying any one or more of the methodologies or functions described herein. The instructions 2316 can also reside, completely or at least partially, within the main memory 2332, within the static memory 2334, within at least one of the processors 2310 (e.g., within the processor's cache memory), or any suitable combination thereof, during execution thereof by the machine 2300. Accordingly, in various embodiments, the main memory 2332, the static memory 2334, and the processors 2310 are considered machine-readable media 2338.

The various memories (i.e., 2330, 1232, 2334, and/or memory of the processor(s) 2312) and/or storage unit 2336 may store one or more sets of instructions and data structures (e.g., software) 2316 embodying or utilized by any one or more of the methodologies or functions described herein. These instructions, when executed by processor(s) 2312 cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The I/O components 2350 include a wide variety of components to receive input, provide output, produce output, transmit information, exchange information, capture measurements, and so on. In general, it will be appreciated that the I/O components 2350 can include many other components that are not shown in FIG. 23. The I/O components 2350 are grouped according to functionality merely for simplifying the following discussion, and the grouping is in no way limiting. In various example embodiments, the I/O components 2350 include output components 2352 and input components 2354. The output components 2352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2350 include biometric components 2356, motion components 2358, environmental components 2360, or position components 2362, among a wide array of other components. For example, the biometric components 2356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 include acceleration sensor components (e.g., accelerometer), gravitation sensor components, rotation sensor components (e.g., gyroscope), and so forth. The environmental components 2360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2350 may include communication components 2364 operable to couple the machine 2300 to a network 2380 or devices 2370 via a coupling 2382 and a coupling 2372, respectively. For example, the communication components 2364 include a network interface component or another suitable device to interface with the network 2380. In further examples, communication components 2364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2370 may be another machine 2300 or any of a wide variety of peripheral devices (e.g., a peripheral device coupled via a Universal Serial Bus (USB)).

Moreover, in some embodiments, the communication components 2364 detect identifiers or include components operable to detect identifiers. For example, the communication components 2364 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 2380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 2380 or a portion of the network 2380 may include a wireless or cellular network, and the coupling 2382 may be a Code Division Multiple Access (CDMA) connection, a Global System for Mobile communications (GSM) connection, or another type of cellular or wireless coupling. In this example, the coupling 2382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2316 are transmitted or received over the network 2380 using a transmission medium via a network interface device (e.g., a network interface component included in the communication components 2364) and utilizing any one of a number of well-known transfer protocols (e.g., Hypertext Transfer Protocol (HTTP)). Similarly, in other example embodiments, the instructions 2316 are transmitted or received using a transmission medium via the coupling 2372 (e.g., a peer-to-peer coupling) to the devices 2370. The term "transmission medium" shall be taken to include any intangible medium that is capable of storing, encoding, or carrying the instructions 2316 for execution by the machine 2300, and includes digital or analog communications signals or other intangible media to facilitate communication of such software.

Furthermore, the machine-readable medium 2338 is non-transitory (in other words, not having any transitory signals) in that it does not embody a propagating signal. However, labeling the machine-readable medium 2338 "non-transitory" should not be construed to mean that the medium is incapable of movement; the medium 2338 should be considered as being transportable from one physical location to another. Additionally, since the machine-readable medium 2338 is tangible, the medium 2338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
generating, by a server system, a places dataset comprising place data from multiple data sources each having a plurality of place data;
based on the places dataset, generating, by the server system, local clusters comprising places located within a predetermined distance;
generating, by the server system, probable pairs of places in each local cluster;
distributing, by the server system, the probable pairs to one or more processors to determine similar edges between one or more places in each local cluster based on a plurality of combined similarity measures indicating whether or not a place is similar to another place;
generating, by the server system, similar pairs based on the combined similarity measures;
converting, by the server system, the similar pairs into connected components comprising groups of similar places based on a best similar edge from all the candidates for a group of similar places;
generating, by the server system, a single place record for each group of similar places; and
providing, by the server system, data about a place associated with a respective single place record to a client device requesting the data, causing navigation via the client device based on the provided data.

2. The method of claim 1, wherein generating the places dataset comprises processing the place data from the multiple data sources to transform the place data into a common format.

3. The method of claim 2, wherein processing the place data from the multiple data sources to transform the place data into a common format further comprises performing at least one of a group comprising: data cleanup, filtering, parsing, and annotation.

4. The method of claim 1, wherein the places located within the predetermined distance comprise places located within a cell of a predetermined size.

5. The method of claim 4, wherein the places located within the predetermined distance further comprise places located within one or more neighboring cells of the cell.

6. The method of claim 1, wherein determining probable pairs comprises at least one of a group comprising: determining each place in each local cluster has at least one common token with another place in the local cluster, determining each place is within a predetermined distance, and determining that a name of a place can be transformed to match at least one other place in the local duster.

7. The method of claim 1, wherein the similar pairs are converted into connected components comprising groups of similar places based on the best similar edge from all the candidates for the group of similar places using Hash-to-Min.

8. The method of claim 1, wherein the similar pairs are converted into connected components comprising groups of similar places based on the best similar edge from all the candidates for the group of similar places using a distributed connected competence analysis.

9. The method of claim 1, further comprising:
traversing each group of similar places to determine negative edges; and
removing negative edges from the group.

10. The method of claim 1, wherein determining similar edges between one or more places in each local cluster based on the plurality of combined similarity measures indicating whether or not a place is similar to another place comprises:
generating a similarity measure score for each similarity measure for each pair of places;
generating an overall similarity score for each pair of places based on a weight associated with each similarity measure score;
determining whether the overall similarity score for each pair of places is larger than a predefined threshold; and
determining that a pair of places is matched based on the overall similarity score for the pair being larger than the predefined threshold.

11. A server computer comprising:
a memory that stores instructions; and
one or more processors configured by the instructions to perform operations comprising:
generating a places dataset comprising place data from multiple data sources each having a plurality of place data;
based on the places dataset, generating local clusters comprising places located within a predetermined distance;

generating probable pairs of places in each local cluster;
distributing the probable pairs to one or more processors to determine similar edges between one or more places in each local cluster based on a plurality of combined similarity measures indicating whether or not a place is similar to another place;
generating similar pairs based on the combined similarity measures;
converting the similar pairs into connected components comprising groups of similar places based on a best similar edge from all the candidates for a group of similar places;
generating a single place record for each group of similar places; and
providing data about a place associated with a respective single place record to a client device requesting the data, causing navigation via the client device based on the provided data.

12. The server computer of claim 11, wherein generating the places dataset comprises processing the place data from the multiple data sources to transform the place data in a common format by performing at least one of a group comprising: data cleanup, filtering, parsing, and annotation.

13. The server computer of claim 11, wherein the places located within the predetermined distance comprise places located within a cell of a predetermined size.

14. The server computer of claim 13, wherein the places located within the predetermined distance further comprise places located within one or more neighboring cells of the cell.

15. The server computer of claim 11, wherein determining probable pairs comprises at least one of a group comprising: determining each place in each local cluster has at least one common token with another place in the local cluster, determining each place is within a predetermined distance, and determining that a name of a place can be transformed to match at least one other place in the local cluster.

16. The server computer of claim 11, wherein the similar pairs are converted into connected components comprising groups of similar places based on the best similar edge from all the candidates for the group of similar places using Hash-to-Min.

17. The server computer of claim 11, wherein the similar pairs are converted into connected components comprising groups of similar places based on the best similar edge from all the candidates for the group of similar places using a distributed connected competence analysis.

18. The server computer of claim 11, the operations further comprising:
traversing each group of similar places to determine negative edges; and
removing negative edges from the group.

19. The server computer of claim 11, wherein determining similar edges between one or more places in each local cluster based on the plurality of combined similarity measures indicating whether or not a place is similar to another place comprises:
generating a similarity measure score for each similarity measure for each pair of places;
generating an overall similarity score for each pair of places based on a weight associated with each similarity measure score;
determining whether the overall similarity score for each pair of places is larger than a predefined threshold; and
determining that a pair of places is matched based on the overall similarity score for the pair being larger than the predefined threshold.

20. A computer-readable medium comprising instructions stored thereon that are executable by at least one processor to cause a computing device to perform operations comprising:
generating a places dataset comprising place data from multiple data sources each having a plurality of place data;
based on the places dataset, generating local clusters comprising places located within a predetermined distance;
generating probable pairs of places in each local cluster;
distributing the probable pairs to one or more processors to determine similar edges between one or more places in each local cluster based on a plurality of combined similarity measures indicating whether or not a place is similar to another place;
generating similar pairs based on the combined similarity measures;
converting the similar pairs into connected components comprising groups of similar places based on a best similar edge from all the candidates for a group of similar places;
generating a single place record for each group of similar places; and
providing data about a place associated with a respective single place record to a client device requesting the data, causing navigation via the client device based on the provided data.

* * * * *

UNITED STATES PATENT AND TRADEMARK OFFICE
CERTIFICATE OF CORRECTION

PATENT NO. : 11,321,579 B2
APPLICATION NO. : 16/518069
DATED : May 3, 2022
INVENTOR(S) : Gupta et al.

It is certified that error appears in the above-identified patent and that said Letters Patent is hereby corrected as shown below:

In the Claims

In Column 24, Line 29, in Claim 6, delete "duster." and insert --cluster.-- therefor Signed and Sealed this
Twenty-second Day of November, 2022

Katherine Kelly Vidal
*Director of the United States Patent and Trademark Office*